United States Patent
Morita et al.

(10) Patent No.: US 12,278,374 B2
(45) Date of Patent: Apr. 15, 2025

(54) CARBON NANOTUBE DISPERSION LIQUID FOR NONAQUEOUS ELECTROLYTE SECONDARY BATTERY, RESIN COMPOSITION USING THE SAME, MIXTURE SLURRY, ELECTRODE FILM, AND NONAQUEOUS ELECTROLYTE SECONDARY BATTERY

(71) Applicants: artience Co., Ltd., Tokyo (JP); TOYOCOLOR CO., LTD., Tokyo (JP)

(72) Inventors: Yu Morita, Tokyo (JP); Hirotomo Ito, Tokyo (JP); Yu Aotani, Tokyo (JP); Tetsuro Izumiya, Tokyo (JP)

(73) Assignees: artience Co., Ltd., Tokyo (JP); TOYOCOLOR CO., LTD., Tokyo (JP)

( * ) Notice: Subject to any disclaimer, the term of this patent is extended or adjusted under 35 U.S.C. 154(b) by 275 days.

(21) Appl. No.: 17/771,004

(22) PCT Filed: Oct. 23, 2020

(86) PCT No.: PCT/JP2020/039972
§ 371 (c)(1),
(2) Date: Apr. 21, 2022

(87) PCT Pub. No.: WO2021/080006
PCT Pub. Date: Apr. 29, 2021

(65) Prior Publication Data
US 2022/0376262 A1 Nov. 24, 2022

(30) Foreign Application Priority Data
Oct. 24, 2019 (JP) .................. 2019-193681
Jun. 26, 2020 (JP) .................. 2020-110335

(51) Int. Cl.
*B32B 9/00* (2006.01)
*C01B 32/174* (2017.01)
*H01M 4/62* (2006.01)
*H01M 4/02* (2006.01)

(52) U.S. Cl.
CPC .......... *H01M 4/625* (2013.01); *C01B 32/174* (2017.08); *H01M 4/622* (2013.01); *C01B 2202/22* (2013.01); *C01B 2202/32* (2013.01); *C01B 2202/34* (2013.01); *C01B 2202/36* (2013.01); *C01P 2002/72* (2013.01); *C01P 2002/82* (2013.01); *H01M 2004/021* (2013.01); *Y10T 428/30* (2015.01)

(58) Field of Classification Search
CPC ..... Y10T 428/30; B82Y 30/00; C01B 32/174; C01B 2202/34; C01B 2202/22; C01B 2202/36; C01B 2202/32; H01M 4/625; H01M 4/622
USPC ........................................ 428/408
See application file for complete search history.

(56) References Cited

U.S. PATENT DOCUMENTS

| | | |
|---|---|---|
| 6,294,291 B1 | 9/2001 | Ozaki et al. |
| 11,196,051 B2 | 12/2021 | Choi et al. |
| 11,286,164 B2 | 3/2022 | Morita et al. |
| 2016/0276670 A1 | 9/2016 | Ochiai et al. |
| 2018/0198129 A1 | 7/2018 | Kim et al. |
| 2018/0248195 A1 | 8/2018 | Choi et al. |
| 2018/0269485 A1 | 9/2018 | Yoo et al. |
| 2021/0226222 A1 | 7/2021 | Morita et al. |

FOREIGN PATENT DOCUMENTS

| | | |
|---|---|---|
| CN | 107851801 | 3/2018 |
| CN | 108028355 | 5/2018 |
| CN | 108028386 | 5/2018 |
| JP | 04155776 | 5/1992 |
| JP | H04237971 | 8/1992 |
| JP | 2004178922 | 6/2004 |
| JP | 2005162877 | 6/2005 |
| JP | 2010254546 | 11/2010 |
| JP | 2011070908 | 4/2011 |
| JP | 2012221672 | 11/2012 |
| JP | 2013108201 | 6/2013 |
| JP | 2014019619 | 2/2014 |
| JP | 2014182892 | 9/2014 |
| JP | 2017141370 | 8/2017 |
| JP | 6380588 81 † | 8/2018 |
| JP | 2018523902 | 8/2018 |
| JP | 2018200804 | 12/2018 |
| JP | 6524479 | 6/2019 |
| JP | 6578618 B1 † | 9/2019 |
| JP | 6586197 | 10/2019 |
| JP | 6586197 B1 † | 10/2019 |
| JP | 6590034 | 10/2019 |

OTHER PUBLICATIONS

"International Search Report (Form PCT/ISA/210) of PCT/JP2020/039972", mailed on Dec. 28, 2020, with English translation thereof, pp. 1-4.
"Office Action of Japan Counterpart Application", issued on Sep. 1, 2020, with English translation thereof, p. 1-p. 8.
Office Action of China Counterpart Application, with English translation thereof, issued on May 12, 2023, pp. 1-16.
"Search Report of Europe Counterpart Application", issued on Nov. 6, 2023, pp. 1-8.

† cited by third party

*Primary Examiner* — Daniel H Miller
(74) *Attorney, Agent, or Firm* — JCIPRNET

(57) ABSTRACT

A carbon nanotube dispersion liquid for nonaqueous electrolyte secondary battery is a carbon nanotube dispersion liquid containing carbon nanotubes, a dispersant and a solvent, and is characterized in satisfying (1) to (3) below: (1) the average outer diameter of the carbon nanotubes ranging from more than 3 nm to 25 nm; (2) the BET surface area of the carbon nanotubes ranging from 150 m²/g to 800 m²/g; and (3) the fiber length of the carbon nanotubes in the carbon nanotube dispersion liquid ranging from 0.8 μm to 3.5 μm.

16 Claims, No Drawings

CARBON NANOTUBE DISPERSION LIQUID FOR NONAQUEOUS ELECTROLYTE SECONDARY BATTERY, RESIN COMPOSITION USING THE SAME, MIXTURE SLURRY, ELECTRODE FILM, AND NONAQUEOUS ELECTROLYTE SECONDARY BATTERY

CROSS-REFERENCE TO RELATED APPLICATION

This application is a 371 application of the International PCT application serial no. PCT/JP2020/039972, filed on Oct. 23, 2020, which claims the priority benefits of Japanese Patent Application No. 2019-193681, filed on Oct. 24, 2019, and Japanese Patent Application No. 2020-110335, filed on Jun. 26, 2020. The entirety of each of the above-mentioned patent applications is hereby incorporated by reference herein and made a part of this specification.

FIELD OF THE INVENTION

Embodiments of this invention relate to a carbon nanotube dispersion liquid for nonaqueous electrolyte secondary batteries, and more specifically relate to a resin composition comprising the carbon nanotube dispersion liquid and a resin, a mixture slurry comprising the carbon nanotube dispersion liquid, a resin and an active material, and an electrode film being a coating film of the mixture slurry, and a nonaqueous electrolyte secondary battery including an electrode film and an electrolyte.

DESCRIPTION OF RELATED ART

With the spread of electric vehicles and the size/weight reduction and performance raise of portable devices, secondary batteries having high energy density and higher capacity of the secondary batteries are required. In such background, due to the characteristics of high energy density and high voltage, nonaqueous electrolyte secondary batteries using nonaqueous electrolyte solutions, especially lithium ion secondary batteries, are used in numerous machines.

As the negative electrode materials of these lithium ion secondary batteries, carbon materials represented by graphite are used currently. The carbon material has a low potential close to that of lithium (Li), and has a large charge-discharge capacity per unit mass. However, for these electrode materials, the charge-discharge capacity per mass has reached a level close to the theoretical value, and the energy density per mass as a battery is close to the limit. Hence, from the viewpoint of improving the utilization ratio as an electrode, attempts have been made to reduce conductive aids and binders that do not contribute to the discharge capacity.

As the conductive aid, carbon black, Ketjen Black, fullerene, graphene, and fine carbon fibers such as carbon nanotubes and carbon nanofibers are used. In particular, carbon nanotubes, which are one type of fine carbon fibers, are used in large quantities. For example, by adding carbon nanotubes to a negative electrode containing graphite and silicon, reduction of electrode resistance, improvement of battery load resistance, improvement of electrode strength, and improvement of electrode expansion and contraction properties are realized, thus improving the cycle life of lithium secondary batteries (for example, refer to Patent Literatures 1, 2, and 3). In addition, studies have also been conducted to reduce electrode resistance by adding carbon nanotubes to the positive electrode (for example, see Patent Literatures 4 and 5). Among them, multilayered carbon nanotubes with an outer diameter of 10 nm to several 10 nm are relatively inexpensive and can be expected to be put into practical use.

When carbon nanotubes with a small average outer diameter are used, a conductive network can be efficiently formed in a small amount, so that the amount of the conductive aid contained in the positive electrode and the negative electrode for a lithium ion secondary battery can be reduced. In addition, it is known that the same effect is obtained even when a carbon nanotube with a long fiber length is used (for example, refer to Patent Literature 6). However, carbon nanotubes having these characteristics are difficult to disperse due to the strong cohesion thereof, and cannot sufficiently satisfy the dispersibility of the carbon nanotube dispersion.

Hence, methods of stabilizing dispersion of carbon nanotubes using various dispersants have been proposed. For example, dispersion in water and N-methyl-2-pyrrolidone (NMP) using a polymer-type dispersant such as a water-soluble polymer polyvinylpyrrolidone has been proposed (see Patent Literatures 4, 5 and 7). However, in Patent Literature 4, an electrode made using carbon nanotubes having an outer diameter of 10 nm to 150 nm was evaluated, but the electrode resistance was high. In addition, in Patent Literature 5, a dispersion liquid using carbon nanotubes with low dibutyl phthalate (DBP) absorption is proposed, which can improve the dispersibility, but is difficult to make high electrical conductivity. In Patent Literature 7, dispersion using single-walled carbon nanotubes is studied, but dispersing carbon nanotubes in a solvent at a high concentration is difficult. In Patent Literature 8, dispersion using two-walled carbon nanotubes is studied. However, oxidation treatment of carbon nanotubes and dispersion by an ultrasonic homogenizer are required, and dispersing carbon nanotubes in a solvent at a high concentration is difficult. In Patent Literature 9, for obtaining carbon nanotubes suitable as a conductive aid of Li-ion secondary batteries, a ball mill-type disperser is used to prepare a carbon nanotube dispersion liquid in which carbon nanotubes with an outer diameter of 150 nm are dispersed into about 2 μm to 7 μm. However, a large amount of carbon nanotubes needs to be used in order to obtain sufficient electrical conductivity.

Therefore, obtaining a carbon nanotube dispersion liquid in which carbon nanotubes having a small outer diameter and a long fiber length are dispersed in a dispersion medium at a high concentration and uniformly is an important issue for the expansion of applications.

CITATION LIST

Patent Literature

Patent Literature 1: Japanese Patent Laid-Open No. Hei 4-155776 (JPH04155776A)
Patent Literature 2: Japanese Patent Laid-Open No. Hei 4-237971 (JPH04237971A)
Patent Literature 3: Japanese Patent Laid-Open No. 2004-178922 (JP2004178922A)
Patent Literature 4: Japanese Patent Laid-Open No. 2011-70908 (JP2011070908A)
Patent Literature 5: Japanese Patent Laid-Open No. 2014-19619 (JP2014019619A)
Patent Literature 6: Japanese Patent Laid-Open No. 2012-221672 (JP2012221672A)

Patent Literature 7: Japanese Patent Laid-Open No. 2005-162877 (JP2005162877A)
Patent Literature 8: Japanese Patent Laid-Open No. 2010-254546 (JP2010254546A)
Patent Literature 9: Japanese Patent Laid-Open No. 2014-182892 (JP2014182892A)

SUMMARY OF THE INVENTION

Technical Problem

This invention provides a carbon nanotube dispersion liquid having high dispersibility, a carbon nanotube resin composition, and a mixture slurry, for obtaining an electrode film with high adhesion and conductivity. More specifically, a nonaqueous electrolyte secondary battery having excellent rate characteristics and cycle characteristics is provided.

Solution to Problem

The inventors of this invention have made diligent studies to address the above issues. The inventors found that an electrode film excellent in electrical conductivity and adhesion can be obtained, and a nonaqueous electrolyte secondary battery excellent in rate characteristics and cycle characteristics can be obtained, by using a carbon nanotube dispersion liquid that contains: carbon nanotubes having an average outer diameter of more than 3 nm and less than 25 nm and a Brunauer-Emmett-Teller (BET) specific surface area of 150 $m^2/g$ to 800 $m^2/g$, a dispersant, and a solvent, wherein the average fiber length of the carbon nanotubes in the carbon nanotube dispersion liquid is 0.8 µm to 3.5 µm. The inventors completed this invention based on the above findings.

That is, embodiments of this invention relate to the followings. However, this invention is not limited to the followings, and includes various embodiments.

An embodiment of this invention relates to a carbon nanotube dispersion liquid for nonaqueous electrolyte secondary battery, which is a carbon nanotube dispersion liquid containing carbon nanotubes, a dispersant and a solvent and is characterized in satisfying (1) to (3) below:
(1) the average outer diameter of the carbon nanotubes ranging from more than 3 nm to 25 nm;
(2) the BET surface area of the carbon nanotubes ranging from 150 $m^2/g$ to 800 $m^2/g$; and
(3) the average fiber length of the carbon nanotubes in the carbon nanotube dispersion liquid ranging from 0.8 µm to 3.5 µm.

A preferred embodiment relates to the above carbon nanotube dispersion liquid which is characterized in that the product of the BET surface area ($m^2/g$) of the carbon nanotubes and the fiber length (µm) of the carbon nanotubes ranges from 200 to 2000.

A preferred embodiment relates to the above carbon nanotube dispersion liquid which is characterized in that the complex elastic modulus thereof is 50 Pa or less and the phase angle thereof is from 10° to 50°.

A preferred embodiment relates to the above carbon nanotube dispersion liquid which is characterized in that while in a Raman spectrum of the carbon nanotubes the maximum peak intensity within the range of 1560 $cm^{-1}$ to 1600 $cm^{-1}$ is G and the maximum peak intensity within the range of 1310 $cm^{-1}$ to 1350 $cm^{-1}$ is D, the ratio G/D ranges from 0.5 to 4.5.

A preferred embodiment relates to the above carbon nanotube dispersion liquid which is characterized in that the volume resistivity of the carbon nanotubes ranges from $1.0\times10^{-2}$ Ω·cm to $3.0\times10^{-2}$ Ω·cm.

A preferred embodiment relates to the above carbon nanotube dispersion liquid which is characterized in that, in a powder X-ray diffraction analysis of the carbon nanotubes, a peak is present at a diffraction angle of 2θ=25°±2° and the half-value width of the peak ranges from 2° to less than 6°.

A preferred embodiment relates to the above carbon nanotube dispersion liquid which is characterized in that the carbon purity of the carbon nanotubes is 95% or more.

A preferred embodiment relates to the above carbon nanotube dispersion liquid which is characterized in that the dispersant is contained in an amount of from 20 parts by mass to 100 parts by mass relative to 100 parts by mass of the carbon nanotubes.

A preferred embodiment relates to the above carbon nanotube dispersion liquid which is characterized in that the cumulative particle size D50 measured by a dynamic light scattering method ranges from 400 nm to 4000 nm.

A preferred embodiment relates to the above carbon nanotube dispersion liquid which is characterized in that the carbon nanotubes are contained in an amount of from 0.5 part by mass to 3.0 parts by mass or less in 100 parts by mass of the carbon nanotube dispersion liquid, and a viscosity thereof measured at 25° C. using a B-type viscometer at a rotor rotation speed of 60 rpm ranges from 10 mPa·s to less than 2000 mPa·s.

A preferred embodiment relates to the above carbon nanotube dispersion liquid which is characterized in that the solvent comprises water. In this embodiment, the solvent preferably contains water in amount of 95 mass % or more relative to the total mass of the solvent.

A preferred embodiment relates to the above carbon nanotube dispersion liquid which is characterized in that the pH thereof ranges from 6 to 11.

Another embodiment relates to a carbon nanotube resin composition characterized in comprising: the carbon nanotube dispersion liquid of an above embodiment, and a binder.

A preferred embodiment relates to the above carbon nanotube resin composition which is characterized in that the binder comprises one or more selected from the group consisting of carboxymethyl cellulose, styrene butadiene rubber and polyacrylic acid.

Another embodiment relates to a mixture slurry characterized in comprising: the carbon nanotube resin composition of an above embodiment, and an active material.

Another embodiment relates to an electrode film being obtained by forming the mixture slurry into a film form.

Another embodiment relates to a nonaqueous electrolyte secondary battery that comprises a positive electrode, a negative electrode and an electrolyte and is characterized in that at least one of the positive electrode and the negative electrode comprises the electrode film of the above embodiment.

The disclosure of this application is related to the subject matter described in Japan Patent Application No. 2019-193681, filed on Oct. 24, 2019, and Japan Patent Application No. 2020-110335, filed on Jun. 26, 2020. The disclosure is incorporated herein by reference.

Advantageous Effects of Invention

By using the carbon nanotube dispersion liquid as an embodiment of this invention, a resin composition, a mixture slurry and an electrode film excellent in electrical conductivity and adhesion can be obtained. In addition, a non-aqueous electrolyte secondary battery excellent in rate characteristics and cycle characteristics can be obtained. Therefore, the carbon nanotube dispersion liquid of this invention can be used in various application fields requiring high electrical conductivity, adhesion, and durability.

DESCRIPTION OF THE EMBODIMENTS

Hereinafter, as embodiments of this invention, a carbon nanotube dispersion liquid, a resin composition, a mixture slurry, an electrode film obtained by forming the mixture slurry into a film form, and a nonaqueous electrolyte secondary battery are described in details, but this invention is not limited to these embodiments and allows various modifications.

<Carbon Nanotube (CNT) Dispersion Liquid>

An embodiment of this invention relates to a carbon nanotube (CNT) dispersion liquid. The carbon nanotube dispersion liquid contains at least carbon nanotubes, a dispersant and a solvent described later.

(Carbon Nanotube)

Carbon nanotubes have a shape formed by winding flat graphite into a cylindrical form. Single-walled carbon nanotubes may be mixed in the carbon nanotubes. Single-walled carbon nanotubes have a structure where one layer of graphite is wound. The multilayered carbon nanotube has a structure where two or more layers of graphite are wound. Further, the sidewall of a carbon nanotube may not have a graphite structure. For example, carbon nanotubes including sidewalls having an amorphous structure can also be used as carbon nanotubes.

The shape of carbon nanotubes is not limited. As the shape, various shapes including a needle shape, a cylindrical tube shape, a fishbone shape (fishbone or cup-stacked type) and a coil shape are exemplified. In addition, the carbon nanotube also may be a plate-shaped or platelet-shaped secondary aggregate obtained by dry-processing a cylindrical tubular carbon nanotube. Among them, the shape of the carbon nanotubes is preferably a needle shape or a cylindrical tubular shape. Carbon nanotubes may have a single shape, or a combination of two or more shapes.

Examples of the form of carbon nanotubes include graphite whiskers, filamentous carbon, graphite fibers, ultrafine carbon tubes, carbon tubes, carbon fibrils, carbon microtubes, and carbon nanofibers. However, this invention is not limited to these. The carbon nanotubes may have one of these forms or a form in which two or more of them are combined.

The average outer diameter of the carbon nanotubes is more than 3 nm and 25 nm or less, more preferably 5 nm or more and 20 nm or less, and even more preferably 5 nm or more and 15 nm or less. When the average outer diameter of the carbon nanotubes is within the above range, the surface of the electrode active material is easily coated with the carbon nanotubes, thereby improving the conductivity and adhesion of the electrode film.

The standard deviation of the outer diameter of the carbon nanotubes is preferably 1 nm to 5 nm, more preferably 1 nm to 4 nm.

In the above embodiment, the outer diameter and the average outer diameter of the carbon nanotubes are obtained as follows. First, carbon nanotubes are observed and photographed with a transmission electron microscope. Next, in the observation photograph, arbitrary 300 carbon nanotubes are selected, and their outer diameters are measured. Next, the average outer diameter (nm) of the carbon nanotubes is calculated as the numerical average of the outer diameters.

The BET specific surface area of the carbon nanotubes is 150 $m^2/g$ to 800 $m^2/g$, more preferably 200 $m^2/g$ to 750 $m^2/g$, and even more preferably 230 $m^2/g$ to 700 $m^2/g$.

The carbon nanotubes used to prepare the carbon nanotube dispersion liquid, i.e., the carbon nanotubes before dispersion have a fiber length preferably from 1 μm to 5 μm, and more preferably from 1 μm to 3.5 μm. The fiber length of the carbon nanotubes can be determined by dispersing the carbon nanotubes in toluene using an ultrasonic homogenizer, followed by observing the carbon nanotubes deposited on a mica substrate using a scanning electron microscopy (SEM) and analyzing the obtained image.

In an embodiment, the product of the BET specific surface area ($m^2/g$) of the carbon nanotubes and the fiber length (μm) of the carbon nanotubes is preferably 200 to 2000. The product is more preferably 300 to 1800, and even more preferably 400 to 1000. When the product of the BET specific surface area ($m^2/g$) of the carbon nanotubes and the fiber length (μm) of the carbon nanotube is within the above range, a dispersion liquid excellent in carbon nanotube dispersibility can be easily obtained. Furthermore, the surface of the electrode active material is easily covered with the carbon nanotubes, thereby improving the conductivity and adhesion of the electrode film.

In an embodiment, carbon nanotubes are preferably such that while in the Raman spectrum thereof the maximum peak intensity in the range of 1560 $cm^{-1}$ to 1600 $cm^{-1}$ is G and the maximum peak intensity in the range of 1310 $cm^{-1}$ to 1350 $cm^{-1}$ is D, the G/D ratio is 0.5 to 10. The G/D ratio is more preferably 0.5 to 4.5, and even more preferably 1.0 to 4.0.

There are various laser wavelengths used in Raman spectroscopic analysis, but in the above embodiment, wavelengths of 532 nm and 632 nm can be used. The Raman shift visible around 1590 $cm^{-1}$ in the Raman spectrum is referred to as the G-band originating from graphite. In addition, the Raman shift visible around 1350 $cm^{-1}$ is referred to as the D-band of defects originating from amorphous carbon or graphite. The higher the G/D ratio of the carbon nanotubes, the higher the degree of graphitization.

In an embodiment, the volume resistivity of the carbon nanotubes is preferably $1.0 \times 10^{-2}$ Ω·cm to $3.0 \times 10^{-2}$ Ω·cm, more preferably $1.0 \times 10^{-2}$ Ω·cm to $2.0 \times 10^{-2}$ Ω·cm. The volume resistivity of carbon nanotubes can be measured using a powder resistivity measuring device (Loresta-GP powder resistivity measuring system MCP-PD-51 made by Mitsubishi Chemical Analytech Co., Ltd.).

In an embodiment, the number of carbon nanotube layers in the carbon nanotubes is preferably 3 or more and 30 or less, more preferably 3 or more and 20 or less, and even more preferably 3 or more and 10 or less.

In an embodiment, as powder X-ray diffraction analysis is performed, it is preferred that the carbon nanotubes have a peak at diffraction angle 2θ=25°±2° and the half-value width of the peak is 2° or more and less than 6°. The half-value width is more preferably 2.5° or more and less than 6°, and even more preferably 3° or more and less than 6°.

The carbon purity of the carbon nanotubes is represented by the percentage (%) of carbon atoms in the carbon nanotubes. The carbon purity is preferably 90 mass % or more, more preferably 95 mass % or more, and even more preferably 98 mass % or more, relative to 100 mass % of the carbon nanotubes.

The amount of metal contained in the carbon nanotubes is preferably less than 10 mass %, more preferably less than 5 mass %, and even more preferably less than 2 mass %, relative to 100 mass % of the carbon nanotubes. Examples of the metal contained in the carbon nanotubes include metals or metal oxides used as catalysts in synthesizing the carbon nanotubes. Specifically, at least one metal selected from the group consisting of cobalt, nickel, aluminum, magnesium, silica, manganese, molybdenum and so on, metal oxides thereof, and composite oxides thereof may be taken as examples.

Carbon nanotubes generally exist in the form of secondary particles. The shape of the secondary particles may be, for example, a state in which carbon nanotubes of general primary particles are intricately intertwined. The shape of the secondary particle also may be an aggregate where carbon nanotubes are arranged linearly. When the shape of the secondary particles of the carbon nanotubes is a linear aggregate, it is easier to loosen than the shape where the carbon nanotubes are entangled with each other. In addition, linear aggregates have better dispersibility than carbon nanotubes in the entanglement shape. Therefore, carbon nanotubes of which the secondary particles have a shape of linear aggregate can be preferably used.

The carbon nanotube may be surface-treated carbon nanotubes. The carbon nanotube may be a carbon nanotube derivative to which a functional group represented by a carboxyl group is given. In addition, carbon nanotubes including organic compounds, metal atoms, or substances represented by fullerenes can also be used.

The carbon nanotubes may be carbon nanotubes produced by any method. Carbon nanotubes can generally be produced by laser ablation, arc discharge, thermal chemical vapor deposition (CVD), plasma CVD, and combustion, but are not limited to these. For example, carbon nanotubes can be produced by contact-reacting a carbon source and a catalyst at 500° C. to 1,000° C. in an environment with an oxygen concentration of 1 vol % or less. The carbon source can be at least any one of hydrocarbons and alcohols.

Any conventionally known raw material can be used as the raw material gas for the carbon source of the carbon nanotubes. For example, as the raw material gas containing carbon, hydrocarbons represented by methane, ethylene, propane, butane and acetylene, carbon monoxide, and alcohols can be used, but this invention is not limited to these. In particular, from the viewpoint of ease of use, it is desirable to use at least any one of hydrocarbons and alcohols as the raw material gas.

(Dispersant)

In the above embodiments, the dispersant can be used without particular limitation within the range that can stabilize the dispersion of carbon nanotubes. For example, at least one of a surfactant and a resin-type dispersant can be used. Surfactants are mainly classified into anionic, cationic, nonionic, and amphoteric. A preferable kind of dispersant can be used in a preferred mixing amount according to the characteristic required for dispersion of carbon nanotubes. In one embodiment, it is preferred to use a resin-type dispersant.

In the case of selecting an anionic surfactant, its kind is not particularly limited. Specific examples thereof include: fatty acid salts, polysulfonate salts, polycarboxylate salts, alkyl sulfate ester salts, alkylarylsulfonate salts, alkylnaphthalenesulfonate salts, dialkylsulfonate salts, dialkylsulfosuccinate salts, alkyl phosphate salts, polyoxyethylene alkyl ether sulfate salts, polyoxyethylene alkyl aryl ether sulfate salts, naphthalene sulfonic acid formalin condensate, polyoxyethylene alkylphosphate sulfonate salts, fatty acid esters of glycerol borate, and fatty acid esters of polyoxyethylene glycerol, but are not limited to these. More specific examples include: sodium dodecylbenzenesulfonate, sodium laurate sulfate, sodium polyoxyethylene lauryl ether sulfate, polyoxyethylene nonylphenyl ether sulfate ester salts, and sodium salt of β-naphthalenesulfonic acid-formalin condensate, but are not limited to these.

The cationic surfactant is exemplified by alkylamine salts and quaternary ammonium salts. Specific examples include: stearylamine acetate, coconut trimethyl ammonium chloride, tallow trimethylammonium chloride, dimethyldioleylammonium chloride, methyl oleyl diethanol chloride, tetramethylammonium chloride, lauryl pyridinium chloride, lauryl pyridinium bromide, lauryl pyridinium disulfate, cetyl pyridinium bromide, 4-alkyl mercaptopyridine, poly(vinylpyridine)-dodecyl bromide, and dodecylbenzyltriethylammonium chloride, but are not limited to these.

The amphoteric surfactant is exemplified by aminocarboxylate salts but not limited to them.

The nonionic surfactant is exemplified by polyoxyethylene alkyl ethers, polyoxyalkylene derivatives, polyoxyethylene phenyl ethers, fatty acid esters of sorbitan, fatty acid esters of polyoxyethylene sorbitan, and alkyl allyl ether, but is not limited to these. Specific examples thereof include: polyoxyethylene lauryl ether, fatty acid esters of sorbitan, and polyoxyethylene octyl phenyl ether, but are not limited to these.

The selected surfactant is not limited to a single surfactant. Two or more surfactants also may be used in combination. For example, a combination of an anionic surfactant and a nonionic surfactant, or a combination of a cationic surfactant and a nonionic surfactant can be used. It is preferred that the mixing amounts at this time include respective preferred mixing amounts of the respective surfactant components. As a combination, the combination of an anionic surfactant and a nonionic surfactant is preferred. The anionic surfactant preferably includes a polycarboxylate salt. The nonionic surfactant preferably includes polyoxyethylene phenyl ether.

Specific examples of the resin-type dispersant include cellulose derivatives (cellulose acetate, cellulose acetate butyrate, cellulose butyrate, cyanoethyl cellulose, ethyl hydroxyethyl cellulose, nitrocellulose, methyl cellulose, ethyl cellulose, hydroxyethyl cellulose, hydroxypropyl cellulose, hydroxypropyl methyl cellulose, and carboxymethyl cellulose, etc.), polyethylene alcohol, polyvinyl butyral, polyvinyl pyrrolidone, and polyacrylonitrile-based polymers, etc. Particularly preferred ones are methyl cellulose, ethyl cellulose, carboxymethyl cellulose, polyvinyl alcohol, polyvinyl butyral, polyvinyl pyrrolidone, and polyacrylonitrile-based polymers.

Carboxymethyl cellulose also can be used in the form of salts such as sodium salts and ammonium salts of carboxymethyl cellulose. For example, the sodium salt may be obtained by substituting the hydroxyl group of carboxymethyl cellulose with a sodium carboxymethyl group. In an embodiment, the dispersant preferably includes at least one selected from the group consisting of polyvinylpyrrolidone, carboxymethylcellulose and its salts, anion-modified polyvinyl alcohol, and copolymers of acrylonitrile and acrylic acid.

In an embodiment, in addition to the dispersant, an inorganic base and an inorganic metal salt may also be included.

As the inorganic base and the inorganic metal salt, a compound containing at least one of an alkali metal and an alkaline earth metal is preferred. Specific examples thereof include chlorides, hydroxides, carbonate salts, nitrate salts, sulfate salts, phosphate salts, tungstate salts, vanadate salts, molybdate salts, niobate salts, and borate salts, etc. containing at least one of alkali metals and alkaline earth metals. In addition, among these, chlorides, hydroxides and carbonate salts containing at least one of alkali metals and alkaline earth metals are preferred from the viewpoint that cations can be easily supplied.

The hydroxide of alkali metal can be exemplified by lithium hydroxide, sodium hydroxide, and potassium hydroxide, etc. The hydroxide of alkaline earth metal can be exemplified by calcium hydroxide, and magnesium hydroxide, etc.

The carbonate salts of alkali metal can be exemplified by lithium carbonate, lithium bicarbonate, sodium carbonate, sodium bicarbonate, potassium carbonate, and potassium bicarbonate, etc. The carbonate salts of alkaline earth metal can be exemplified by calcium carbonate and magnesium carbonate.

Among these, at least one selected from the group consisting of lithium hydroxide, sodium hydroxide, lithium carbonate, and sodium carbonate is more preferred.

In the above embodiments, in addition to the dispersant, an antifoaming agent may also be included. As the antifoaming agent, arbitrary component such as a commercially available antifoaming agent, a wetting agent, a hydrophilic organic solvent or a water-soluble organic solvent can be used as long as it has an antifoaming effect. The antifoaming agents may each be used alone, or may be used in combination of two or more.

Examples of the antifoaming agents include:
alcohol type: ethanol, propanol, isopropanol, butanol, octyl alcohol, hexadecyl alcohol, acetylene alcohol, ethylene glycol monobutyl ether, methyl cellosolve, butyl cellosolve, propylene glycol monomethyl ether, acetylene glycol, polyoxyalkylene glycol, propylene glycol, other glycols, etc.,
fatty acid ester type: diethyleneglycol laurate, glycerol monoricinoleate, alkenylsuccinic acid derivatives, sorbitan monolaurate, sorbitol trioleate, polyoxyethylene monolaurate, polyoxyethylene sorbitol monolaurate, and natural wax, etc.,
amide type: polyoxyalkylene amides, and acrylate polyamines, etc.,
phosphate ester type: tributyl phosphate, and sodium octyl phosphate, etc.,
metal soap type: aluminum stearate, and calcium oleate, etc.,
oil/fat type: animal and vegetable oils, sesame oil, and castor oil, etc.,
mineral oil type: kerosene, and paraffin, etc.,
silicone type: dimethyl silicone oil, silicone paste, silicone emulsion, organo-modified polysiloxane, and fluorosilicone oil, etc.

(Solvent)
In the above embodiments, the solvent is not particularly limited as long as it is a range in which the carbon nanotubes can be dispersed. The solvent is preferably, for example, any one of water and a water-soluble organic solvent, or a mixed solvent of two or more. The solvent more preferably contains water at least. When the solvent contains water, the content of water is preferably 95 parts by mass or more, and more preferably 98 parts by mass or more, relative to the entire solvent (100 parts by weight).

As the water-soluble organic solvents, the followings can be used:
alcohol solvents (methanol, ethanol, propanol, isopropanol, butanol, isobutanol, sec-butanol, tert-butanol, and benzyl alcohol, etc.),
polyol solvents (ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol, etc.),
polyol ether solvents (ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monoethyl ether, propylene glycol monobutyl ether, ethylene glycol monomethyl ether acetate, triethylene glycol monomethyl ether, triethylene glycol monoethyl ether, triethylene glycol monobutyl ether, ethylene glycol monophenyl ether, propylene glycol monophenyl ether, etc.),
amine solvents (ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, and tetramethylpropylenediamine, etc.),
amide solvents (N-methyl-2-pyrrolidone (NMP), N-ethyl-2-pyrrolidone (NEP), N,N-dimethylformamide, N,N-dimethylacetamide, N,N-diethylacetamide, and N-methylcaprolactam, etc.),
heterocyclic solvents (cyclohexylpyrrolidone, 2-oxazolidinone, 1,3-dimethyl-2-imidazolidinone, and γ-butyrolactone, etc.),
sulfoxide solvents (dimethyl sulfoxide, etc.),
sulfone solvents (hexamethylphosphoric triamide, and sulfolane, etc.),
lower-ketones solvents (acetone, and methyl ethyl ketone, etc.), and
other solvents including tetrahydrofuran, urea, and acetonitrile, etc.

(Characteristics of Carbon Nanotube (CNT) Dispersion Liquid)

In an embodiment, the carbon nanotube dispersion liquid comprises carbon nanotubes, a dispersant and a solvent.

In an embodiment, the fiber length of the carbon nanotubes in the carbon nanotube dispersion liquid is from 0.8 μm to 3.5 μm, and more preferably from 0.8 μm to 2.5 μm.

In an embodiment, the cumulative particle size D50 of the carbon nanotube dispersion liquid is preferably 400 nm to 4000 nm, and more preferably 1000 nm to 3000 nm. The cumulative particle diameter D50 of the carbon nanotube dispersion liquid can be measured using a particle size distribution meter (Nanotrac UPA-EX, made by Microtrac-BEL Corp.).

In order to obtain the carbon nanotube dispersion liquid of the above embodiment, it is preferred to carry out a treatment of dispersing carbon nanotubes in a solvent. The dispersing apparatus for performing the above dispersing treatment is not particularly limited.

As the dispersing apparatus, a dispersing machine commonly used in pigment dispersion and the like can be used. Examples thereof include: mixers such as a disperser, a homomixer, and a planetary mixer,
media-type dispersers including homogenizers (Advanced Digital Sonifer (registered trademark) 450DA made by BRANSON Corporation, Clearmix made by M Technique Co., Ltd., Filmix and the like made by PRIMIX Corporation, and Abramix and the like made by Silverson), paint conditioner (made by Red Devil, Inc.), colloid mills (PUC Colloid Mill made by PUC Corporation, and Colloid Mill MK made by IKA Corporation), cone mill (Cone Mill MKO made by IKA Corporation, etc.), ball mill, sand mill (Dyno-Mill made by Shinmaru Enterprises Corporation, etc.), attritor, pearl mill (DCP Mill made by Eirich Co., Ltd., etc.), and coball mill, etc., medium-less dispersers including wet jet mills (Genus PY made by Genus Co., Ltd., Star Burst made by Sugino Machine Ltd., and Nanomizer made by Nanomizer Inc., etc.), Clear SS-5 made by M Technique Co., Ltd., and MICROS made by Nara Machinery Co., Ltd., etc., and other roll mills, and so on, but the dispersing apparatus is not limited to these.

In an embodiment, the dispersion treatment for preparing the carbon nanotube dispersion liquid is preferably performed using a homogenizer or a paint conditioner. The dispersion treatment using a homogenizer is preferably carried out, for example, under a high pressure of 60 MPa to 150 MPa. When the dispersion treatment is performed using a paint conditioner, it is preferred to use beads such as zirconia beads. The diameter of the used beads is preferably less than 1.25 mm, and more preferably 1.0 mm or less. In an embodiment, the diameter of the beads may range from 0.1 mm to 0.5 mm.

In an embodiment, relative to 100 parts by mass of the carbon nanotube dispersion liquid, the amount of the carbon nanotubes in the carbon nanotube dispersion liquid is preferably 0.2 part by mass to 20 parts by mass, more preferably 0.5 part by mass to 10 parts by mass parts, and even more preferably 0.5 part by mass to 3.0 parts by mass.

In an embodiment, relative to 100 parts by mass of the carbon nanotubes, the amount of the dispersant in the carbon nanotube dispersion liquid is preferably 20 to 100 parts by mass, more preferably 20 to 80 parts by mass, and even more preferably 20 to 50 parts by mass.

The carbon nanotube dispersion liquid preferably has a complex elastic modulus of 50 Pa or less, and a phase angle of 10° to 50°. The complex elastic modulus and the phase angle can be evaluated by dynamic viscoelasticity measurement. There is a tendency that the better the dispersibility of the carbon nanotubes, the lower the viscosity of the carbon nanotube dispersion liquid, and the smaller the complex elastic modulus of the carbon nanotube dispersion liquid. In addition, the phase angle refers to the phase shift of the stress wave when the strain applied to the carbon nanotube (CNT) dispersion liquid is a sine wave. In the case of a pure elastic body, the stress wave becomes a sine wave with the same phase as the applied strain, so the phase angle is 0°. On the other hand, in the case of a pure viscous body, the stress wave advances by 90°. For a general viscoelasticity measurement sample, the stress wave becomes a sine wave with a phase angle larger than 0° and smaller than 90°. When the dispersibility of CNTs in a CNT dispersion liquid is good, the phase angle is close to 90° as a pure viscous body.

When the fiber length of the carbon nanotubes in the carbon nanotube dispersion liquid is large, even if the dispersion is good, the complex elastic modulus may become a high value as the carbon nanotubes themselves have structural viscosity. However, the carbon nanotube dispersion liquid having the values of the complex elastic modulus and the phase angle within the above ranges has good dispersion particle size and dispersibility of the carbon nanotubes, and therefore can be preferably used as a carbon nanotube dispersion liquid for nonaqueous electrolyte secondary batteries.

In an embodiment, the pH of the carbon nanotube dispersion liquid can be from 6 to 12. The pH is preferably from 6 to 11, more preferably from 7 to 11, even more preferably from 8 to 11, and particularly preferably from 9 to 11. The pH of the carbon nanotube dispersion liquid can be measured using a pH meter (pH METER F-52 made by Horiba, Ltd.).

In an embodiment, the viscosity of the carbon nanotube dispersion liquid is specified for a dispersion liquid containing 0.5 part by mass or more and 3.0 parts by mass or less of carbon nanotubes in 100 parts by mass of the carbon nanotube dispersion liquid. The viscosity of the dispersion liquid measured at 60 rpm using a B-type viscometer is preferably 10 mPa·s or more and less than 10,000 mPa·s, more preferably 10 mPa·s or more and less than 2,000 mPa·s.

<Carbon Nanotube Resin Composition>

An embodiment of this invention relates to a carbon nanotube resin composition that contains carbon nanotubes, a dispersant, a solvent and a binder. The binder is described below.

(Binder)

The binder refers to a resin for binding together pieces of the same substance such as the carbon nanotubes.

Examples of the binder include: polymers and copolymers including ethylene, propylene, vinyl chloride, vinyl acetate, vinyl alcohol, maleic acid, acrylic acid, acrylate ester, methacrylic acid, methacrylate ester, acrylonitrile, styrene, vinyl butyral, vinyl acetal, vinyl pyrrolidone as a constituent unit; polyurethane resins, polyester resins, phenolic resins, epoxy resins, phenoxy resins, urea resins, melamine resins, alkyd resins, acrylic resins, formaldehyde resins, silicone resins, and fluoro-resins; cellulose resins such as carboxymethyl cellulose; rubbers such as styrene butadiene rubber and fluoro-rubber; conductive resins such as polyaniline and polyacetylene, and so on.

The binders may also include modified products, mixtures and copolymers of the resins. Among them, the binder preferably contains at least one selected from the group consisting of carboxymethyl cellulose, styrene butadiene rubber, and polyacrylic acid.

The carboxymethyl cellulose used as the binder resin is preferably high in viscosity. For example, the viscosity in preparing a 1% aqueous solution of carboxymethyl cellulose is preferably from 500 mPa·s to 6000 mPa·s, and more preferably from 1000 mPa·s to 3000 mPa·s. The viscosity of a 1% aqueous solution of carboxymethyl cellulose can be measured using a B-type viscometer rotor at a rotational speed of 60 rpm under the condition of 25° C.

The carboxymethyl cellulose used as the binder resin preferably has a high degree of etherification. For example, the etherification degree is preferably from 0.6 to 1.5, and more preferably from 0.8 to 1.2.

The kind of binder and its amount ratio can be appropriately selected according to the properties of the coexisting substances such as the carbon nanotubes and the active material. For example, regarding the usage amount of carboxymethyl cellulose, when the mass of the active material is 100 mass %, the proportion of carboxymethyl cellulose is preferably from 0.5 mass % to 3.0 mass %, and more preferably from 1.0 mass % to 2.0 mass %.

If the styrene butadiene rubber used as the binder resin is an oil-in-water emulsion, it can be a substance generally used as a binder for electrodes. In an embodiment, the binder is preferably an emulsion containing styrene butadiene rubber. For example, TRD2001 produced by JSR Corporation can be preferably used. Regarding the amount of styrene butadiene rubber used, when the mass of the active material is 100 mass %, the proportion of the styrene butadiene rubber is preferably 0.5 mass % to 3.0 mass %, and more preferably 1.0 mass % to 2.0 mass %.

Regarding the usage amount of polyacrylic acid, when the mass of the active material is 100 mass %, the proportion of the polyacrylic acid is preferably from 1 mass % to 25 mass %, and more preferably from 5 mass % to 20 mass %.

In an embodiment, the carbon nanotube resin composition comprises carbon nanotubes, a dispersant, a solvent and a binder. The carbon nanotube resin composition may include the carbon nanotube dispersion liquid of the above embodiment, and a binder.

In order to obtain the carbon nanotube resin composition of the above embodiment, it is preferable to mix and homogenize the carbon nanotube dispersion liquid with the binder. As the mixing method, various conventionally known methods can be applied. The carbon nanotube resin composition can be produced using the dispersing apparatuses described in the above description of the carbon nanotube dispersion liquid.

<Mixture Slurry>

An embodiment of this present invention relates to a mixture slurry. The mixture slurry contains carbon nanotubes, a dispersant, a solvent, a binder, and an active material. The mixture slurry may include the carbon nanotube resin composition of the above embodiment, and an active material.

(Active Material)

In the embodiment, the active material refers to a material that forms the basis of a battery reaction. From the viewpoint of electromotive force, the active materials are classified into positive electrode active materials and negative electrode active materials.

The positive electrode active material is not particularly limited, and metal compounds such as metal oxides and metal sulfides, conductive polymers and so on that allow doping or intercalation of lithium ions can be used.

Examples thereof include oxides of transition metals such as Fe, Co, Ni and Mn, composite oxides with lithium, and inorganic compounds such as transition metal sulfides, etc. Specific examples include: powders of transition metal oxides such as MnO, $V_2O_5$, $V_6O_{13}$ and $TiO_2$, powders of complex oxides with transition metal such as lithium nickelate, lithium cobaltate and lithium manganate having a layered structure, and lithium manganate having a spinel structure, etc., lithium iron phosphate-based material which is a phosphate compound of olivine structure, powders of transition metal sulfides such as $TiS_2$ and FeS, and so on.

The positive active material also may be an organic compound. For example, conductive polymers such as polyaniline, polyacetylene, polypyrrole, and polythiophene can also be used. As the positive electrode active material, an above inorganic compound and an above organic compound may be mixed for use.

The negative electrode active material is not particularly limited, as long as it allows doping or intercalation of lithium ions. Examples thereof include: metal Li, alloys such as tin alloys, silicon alloys and lead alloys, etc. being alloys of Li, metal oxides such as $Li_xFe_2O_3$, $Li_xFe_3O_4$, $Li_xWO_2$ ($0<x<1$), lithium titanate, lithium vanadate and lithium silicate, etc., conductive polymers such as polyacetylene and poly-p-phenylene, etc., amorphous carbon materials such as soft carbon and hard carbon, graphite materials such as artificial graphite (such as highly graphitized carbon material) and natural graphite, etc., and carbon materials such as carbon black, mesophase carbon black, resin calcined carbon materials, gas phase growth carbon fibers and carbon fibers, etc. These negative electrode active materials may each be used alone or may be used in combination of two or more.

In an embodiment, as the negative electrode active material, a silicon-based negative electrode active material being a negative electrode active material containing silicon, such as a silicon alloy and lithium silicate, is preferred.

Examples of silicon-based negative electrode active material include: the so-called metallurgical grade silicon produced by using carbon to reduce silicon dioxide; the industrial grade silicon that has reduced impurities by acid treatment or unidirectional solidification of the metallurgical grade silicon; high-purity silicon of different crystalline states such as high-purity single crystal, polycrystalline and amorphous states produced by silane obtained by reacting silicon; and silicon of which the crystalline state and precipitation state have been adjusted while the industrial grade silicon is made into high purity by a sputtering method or an electron beam (EB) evaporation method, etc.

In addition, silicon oxide being a compound of silicon and oxygen, various alloys with silicon, and silicon compounds of which the crystalline state have been adjusted by a quenching method or the like are also taken as examples. Among them, a preferred silicon-based negative electrode active material is a mixture of silicon nanoparticles and silicon oxide, which has a structure where silicon nanoparticles are dispersed in silicon oxide, and of which the outer side is covered with a carbon film.

In an embodiment, the negative electrode active material may contain, in addition to the silicon-based negative electrode active material, a carbonaceous, graphitic carbonaceous or graphitic material as a carbon material. Examples of the carbonaceous material include amorphous carbonaceous materials such as soft carbon and hard carbon. Examples of the graphitic materials include artificial graphite such as a highly graphitized carbon material, and natural graphite, etc. Among them, powders of graphitic materials such as artificial graphite and natural graphite are preferably used.

When the carbon material such as artificial graphite or natural graphite is set as 100 mass %, the amount of silicon-based negative electrode active material is preferably from 3 mass % to 50 mass %, and more preferably from 5 mass % to 25 mass %.

In an embodiment, the BET specific surface area of the active material is preferably from 0.1 $m^2/g$ to 10 $m^2/g$, more preferably from 0.2 $m^2/g$ to 5 $m^2/g$, and even more preferably from 0.3 $m^2/g$ to 3 $m^2/g$.

In an embodiment, the average particle size of the active material is preferably in the range of 0.5 μm to 50 μm, and more preferably in the range of 2 μm to 20 μm. The "average particle size of an active material" described in this specification means the average value of particle sizes obtained by measuring the active material with an electron microscope.

(Manufacturing Method of Mixture Slurry)

The mixture slurry of the above embodiment can be produced by various methods known in the prior art. Examples of the production methods include: a method of adding an active material to the carbon nanotube resin composition, and a method of adding a binder after adding an active material to the carbon nanotube dispersion liquid.

In an embodiment, in order to obtain the mixture slurry, it is preferred to further perform a dispersion treatment after adding the active material to the carbon nanotube resin composition. The dispersing apparatus used for the dispersion treatment is not particularly limited. The mixture slurry can be prepared using the dispersing apparatus described in the descriptions for the carbon nanotube dispersion liquid of the above embodiment.

In an embodiment, relative to 100 parts by mass of the mixture slurry, the amount of the active material in the mixture slurry is preferably from 20 parts by mass to 85 parts by mass, more preferably from 30 parts by mass to 75 parts by mass, and even more preferably from 40 parts by mass to 70 parts by mass.

In an embodiment, relative to 100 parts by mass of the active material, the amount of the carbon nanotubes in the mixture slurry is preferably from 0.01 part by mass to 10 parts by mass, more preferably from 0.02 part by mass to 5 parts by mass, and even more preferably from 0.03 part by mass to 1 part by mass.

In an embodiment, relative to 100 parts by mass of the active material, the amount of the binder in the mixture slurry is preferably from 0.5 mass % to 30 mass %, more preferably from 1 mass % to 25 mass %, and particularly preferably from 2 mass % to 20 mass %.

In an embodiment, relative to 100 mass % of the mixture slurry, the amount of the solid content of the mixture slurry is preferably from 30 mass % to 90 mass %, more preferably from 30 mass % to 80 mass %, and even more preferably from 40 mass % to 75 mass %.

<Electrode Film>

An embodiment of this invention relates to an electrode film preferably as an electrode mixture layer provided on a current collector. The electrode film can be obtained by forming the mixture slurry of the above embodiment into a film form. For example, the electrode film may be a coated film (dried coated film) obtained by coating the mixture slurry on a current collector and drying the mixture slurry.

The current collector to be provided with the electrode film of the above embodiment is not particularly limited. Materials and shapes applicable to various secondary batteries can be appropriately selected. Examples of the material of the current collector include metals such as aluminum, copper, nickel, titanium and stainless steel, and alloys thereof. In addition, as the shape of the current collector, a flat foil shape may be generally used, but a shape with a roughened surface, a perforated foil-like shape, and a mesh shape also may be used.

The method of coating the mixture slurry on the current collector is not particularly limited, and known methods can be used. Specifically, a die coating method, a dip coating method, a roll coating method, a doctor coating method, a knife coating method, a spray coating method, a gravure coating method, a screen printing method, and an electrostatic coating method can be taken as examples. As the drying method, standing drying, a blow dryer, a warm air dryer, an infrared heater or a far infrared heater, etc. can be used, but the drying method is not particularly limited to these.

After the coating, a calendering process using a flat plate press, a calender roll or the like may also be performed. The thickness of the electrode mixture layer is generally 1 μm or more and 500 μm or less, and preferably 10 μm or more and 300 μm or less.

<Nonaqueous Electrolyte Secondary Battery>

An embodiment of this invention relates to a nonaqueous electrolyte secondary battery. The nonaqueous electrolyte secondary battery includes a positive electrode, a negative electrode, and an electrolyte.

As the positive electrode, the product of coating the mixture slurry containing a positive electrode active material on a current collector and drying the same to make an electrode film can be used.

As the negative electrode, the product of coating the mixture slurry containing a negative electrode active material on a current collector and drying the same to make an electrode film can be used.

As the electrolyte, various conventionally known compounds allowing movement of ions can be used. A compound that can be used as the electrolyte may include, for example, a lithium salt such as $LiBF_4$, $LiClO_4$, $LiPF_6$, $LiAsF_6$, $LiSbF_6$, $LiCF_3SO_3$, $Li(CF_3SO_2)_2N$, $LiC_4F_9SO_3$, $Li(CF_3SO_2)_3C$, $LiI$, $LiBr$, $LiCl$, $LiAlCl$, $LiHF_2$, $LiSCN$, or $LiBPh_4$ (wherein Ph is a phenyl group), etc. However, the electrolyte is not limited to these, and compounds containing a sodium salt or a calcium salt also can be used. The electrolyte is preferably dissolved in a nonaqueous solvent to be used as an electrolytic solution.

The nonaqueous solvent is not particularly limited. Examples thereof include: carbonates such as ethylene carbonate, propylene carbonate, butylene carbonate, dimethyl carbonate, ethyl methyl carbonate, and diethyl carbonate, etc.; lactones such as γ-butyrolactone, γ-valerolactone, and γ-octanolactone, etc.; glymes such as tetrahydrofuran, 2-methyltetrahydrofuran, 1,3-dioxolane, 4-methyl-1,3-dioxolane, 1,2-methoxyethane, 1,2-ethoxyethane, and 1,2-dibutoxyethane, etc.; esters such as methyl formate, methyl acetate, and methyl propionate, etc.; sulfoxides such as dimethyl sulfoxide and sulfolane, etc.; and nitriles such as acetonitrile, etc. These solvents may each be used alone or may be used in combination of two or more.

In the above embodiment, the nonaqueous electrolyte secondary battery preferably includes a separator. As the separator, for example, a polyethylene non-woven fabric, a polypropylene non-woven fabric, a polyamide non-woven fabric, or a material to which a hydrophilic treatment has been performed can be used. However, the separator is not particularly limited to these.

The structure of the nonaqueous electrolyte secondary battery is not particularly limited, and usually includes a positive electrode and a negative electrode, and a separator provided as required. The shape of the nonaqueous electrolyte secondary battery may be of a paper type, a cylindrical type, a button type or a laminate type, etc., and various shapes may be provided according to the purposes of uses.

EXAMPLES

Examples are provided below to more specifically describe this invention. This invention is not limited to the following examples as long as the gist of this invention is not exceeded. In the Examples, "carbon nanotube" is sometimes abbreviated to "CNT". In addition, unless otherwise specified, "part" means "mass part", and "%" means "mass %".

<1> Measurement Methods for Physical Properties

The physical properties of the CNTs used in the respective Examples and Comparative Examples to be described later were measured by the following methods.

<BET Specific Surface Area of CNT>
CNT was weighed for 0.03 g using an electronic balance (MSA225S100DI made by Sartorius Corporation) and then dried at 110° C. for 15 minutes while degassing. After that, the BET specific surface area of the CNT was measured using an automatic specific surface area measuring device (HM model-1208 made by MOUNTECH Co., Ltd.)

<Fiber Length of CNT>
CNT was weighed for 0.2 g in a 450 mL SM vial (made by Sansyo, Co., Ltd.) using an electronic balance (MSA225S100DI made by Sartorius Corporation). Next, 200 mL of toluene was added, and an ultrasonic homogenizer (Advanced Digital Sonifer (registered trademark), model 450DA, made by BRANSON Corporation) was used to perform a dispersion treatment at an amplitude of 50% for 1 minute to prepare a CNT dispersion liquid.

Next, after dropping several μL of the CNT dispersion liquid on a mica substrate, the liquid was dried in an electric oven at 120° C. to prepare a substrate for observing the length of CNT fibers. Then, the surface of the substrate prepared for observing the length of the CNT fibers was sputtered with platinum. After that, observation was carried out using SEM. During the observation, according to the fiber length of the CNTs, a plurality of photographs containing 10 or more CNTs in the field of view were taken at a magnification of 5000 times or 20000 times, and the fiber lengths of 100 CNTs randomly extracted were measured, and the average value was set as the fiber length (μm) of CNTs.

<Average Outer Diameter of CNT>
CNT was weighed for 0.2 g in a 450 mL SM vial (made by Sansyo, Co., Ltd.) using an electronic balance (MSA225S100DI made by Sartorius Corporation). Then, 200 mL of toluene was added, and an ultrasonic homogenizer (Advanced Digital Sonifer (registered trademark), model 450DA, made by BRANSON Corporation) was used to perform a dispersion treatment at an amplitude of 50% under ice cooling for 5 minutes to prepare a CNT dispersion liquid.

Next, the CNT dispersion liquid was appropriately diluted, and several μL thereof were added dropwise in the form of a collodion film, dried at room temperature, and then directly observed using a transmission electron microscope (H-7650 made by Hitachi, Ltd.). The observation was performed at a magnification of 50,000 times, and a plurality of photographs including 10 or more CNTs in the field of view were taken. The outer diameters of 300 CNTs arbitrarily extracted from the photographs were measured, and the average value was defined as the average outer diameter (nm) of the CNTs.

<Length of CNT Fiber in CNT Dispersion Liquid>
The CNT dispersion liquids prepared in the Examples and Comparative Examples described later were diluted with a solvent so that the CNT concentration became 0.01 mass %. As the solvent, the same solvent as that used in the preparation of the CNT dispersion liquid was used. After dropping several μL of the diluted dispersion liquid on a mica substrate, the liquid was dried in an electric oven at 120° C. to prepare a substrate for observing the fiber length of CNTs.

Next, the surface of the substrate prepared for observing the CNT fiber length was sputtered with platinum. Then, observation was carried out using SEM. In the observation, according to the fiber length of the CNTs, a plurality of photographs containing 10 or more CNTs in the field of view are taken at a magnification of 5000 times or 20000 times. The fiber lengths of 100 CNTs arbitrarily extracted from the photographs were measured, and the average value is the average fiber length (μm) of the CNTs in the CNT dispersion liquid.

<G/D Ratio of CNT>
The CNTs were placed in a Raman microscope (XploRA made by Horiba, Ltd.), and the measurement was performed with a laser wavelength of 532 nm. The measurement conditions include: take-in time of 60 seconds, accumulation count of 2 times, dimming filter at 10%, objective lens magnification of 20 times, confocus hole 500, slit width of 100 μm, and measurement wavelength of 100 $cm^{-1}$ to 3000 $cm^{-1}$. The CNTs for measurement were separated and taken onto a glass slide, and then flattened using a spatula. Regarding the obtained peaks, while in the spectrum the maximum peak intensity in the range of 1560 $cm^{-1}$ to 1600 $cm^{-1}$ was G, and the maximum peak intensity in the range of 1310 $cm^{-1}$ to 1350 $cm^{-1}$ was D, the G/D ratio was calculated and defined as the G/D ratio of CNT.

<Half-Value Width of CNT>
CNTs were placed on the central concave portion of an aluminum sample plate (outer diameter: ϕ46 mm, thickness: 3 mm, sample portion: ϕ26.5 mm, thickness: 2 mm), and flattened using a slide glass. Then, a drug wrapping paper was placed on the surface on which the sample was placed, and a load of 1 ton was applied to the surface on which the aluminum Hi-sheet packing was placed to flatten the sample. Then, the drug wrapping paper and the aluminum Hi-sheet packing were removed to obtain a sample for powder X-ray diffraction analysis of CNTs.

Next, the powder X-ray diffraction analysis sample of the CNTs was placed in an X-ray diffractometer (Ultima 2100 made by Rigaku Corporation), which was operated from 15° to 35° to perform analysis. Sampling was performed every 0.02°, and the scanning speed was set to 2°/min. The voltage was set to 40 kV, the current set to 40 mA and the X-ray source set to CuKα ray. The plots appearing at the diffraction angle 2θ=25°±2° obtained at this time were each subjected to a simple moving average of 11 points, and the half-value width of the peak was defined as the half-value width of the CNT. The line connecting the plots of 2θ=16° and 2θ=34° was set as the baseline.

<Volume Resistivity of CNT>
A powder resistivity measuring device (Loresta-GP powder resistivity measuring system MCP-PD-51 made by Mitsubishi Chemical Analytech Co., Ltd.) was used, the sample mass was set to 1.2 g, a probe unit for powder (four probes·ring electrodes, electrode interval: 5.0 mm, electrode radius: 1.0 mm, sample radius: 12.5 mm) was used and the applied voltage limiter set to 90 V, and the volume resistivities [Ω·cm] of the conductive powder under various pressures were measured. The volume resistivity value of CNTs at a density of 1 $g/cm^3$ was evaluated.

<Carbon Purity of CNT>
The CNTs were acid-decomposed with a microwave sample pretreatment device (ETHOS1 made by Milestone General K.K.), and the metals contained in the CNTs were extracted. Then, analysis was performed using a multi-type ICP emission spectrometer (720-ES made by Agilent Technologies, Inc.), and the amount of the metals contained in the extract was calculated. The carbon purity of the CNTs was calculated as follows:

Carbon purity (%)=((mass of CNTs−mass of metals in CNTs)÷mass of CNTs)×100    Formula 1:

<Measurement of Particle Size Distribution of CNT Dispersion Liquid>

After the CNT dispersion is placed still in a thermostat at 25° C. for more than 1 hour, the CNT dispersion is sufficiently stirred and diluted. Next, the cumulative particle diameter D50 of the CNT dispersion was measured by a particle size distribution analyzer (Nanotrac UPA-EX made by MicrotracBEL Corp.). The permeability was taken as absorption, the density of CNTs taken as 1.8, the shape taken as aspherical, and the refractive index of the solvent set to 1.333. The measurement was performed while the concentration of the CNT dispersion liquid was diluted such that the numerical value of the loading index was in the range of 0.8 to 1.2.

<pH Measurement of CNT Dispersion Liquid>

After the CNT dispersion liquid was placed still in a thermostat at 25° C. for more than 1 hour, the CNT dispersion liquid was sufficiently stirred. Next, a pH meter (pH METER F-52 made by Horiba, Ltd.) was used to measure the pH value.

<Measurements of Complex Elastic Modulus and Phase Angle of CNT Dispersion Liquid>

The complex elastic modulus and phase angle of the CNT dispersion liquid were evaluated in the manner below. A rheometer with a cone of a diameter of 35 mm and 2° (RheoStressl rotational rheometer made by Thermo Fisher Scientific Inc.) was used to measure the dynamic viscoelasticity at strain ratios of 0.01% to 5% at a frequency of 1 Hz at 25° C.

<Viscosity of CNT Dispersion Liquid>

After the CNT dispersion liquid was placed still in a thermostat at 25° C. for more than 1 hour, it was sufficiently stirred, and then a B-type viscometer rotor was used to immediately measure at a rotational speed of 60 rpm. For the rotor used in the measurement, No. 1 was used when the viscosity value was less than 100 mPa·s, No. 2 was used when the viscosity was 100 mPa·s or more and less than 500 mPa·s, No. 3 was used when the viscosity value was 500 mPa·s or more and less than 2000 mPa·s, and No. 4 was used when the viscosity value was 2000 mPa·s or more and less than 10000 mPa·s.

<Volume Resistivity of Electrode Film for Negative Electrode>

The mixture slurry for the negative electrode was applied to a copper foil using an applicator, in a manner such that the weight per unit area of the electrode was 8 mg/cm², to form a coating film. Next, the coating film was dried in an electric oven at 120° C.±5° C. for 25 minutes. The surface resistivity (W/o) of the dry coating film was then measured using Loresta GP MCP-T610 made by Mitsubishi Chemical Analytech Co., Ltd. After the measurement, the thickness of the electrode mixture layer (dry coating film) formed on the copper foil was multiplied to obtain the volume resistivity (Ω·cm) of the electrode film for the negative electrode. The thickness of the electrode mixture layer was obtained by subtracting the thickness the copper foil from the average thickness value obtained by measuring three points in the electrode film using a film thickness gauge (Digimicro MH-15M made by NIKON).

<Peel Strength of Electrode Film for Negative Electrode>

The mixture slurry for the negative electrode was applied to a copper foil using an applicator, in a manner such that the weight per unit area of the electrode was 8 mg/cm², to form a coating film. Next, the coating film was dried in an electric oven at 120° C.±5° C. for 25 minutes. Then, with the coating direction as the long axis, the dried coating film was cut into two rectangles of 90 mm×20 mm to obtain samples.

In measuring the peel strength, a desktop tensile tester (Strograph E3 made by Toyo Seiki Seisaku-sho, Ltd.) was used, and the evaluation was performed by a 180-degree peel test method. Specifically, one side of a double-sided tape (No. 5000NS produced by Nitoms, Inc.) having a size of 100 mm×30 mm was attached to a stainless steel plate, and the battery electrode mixture layer of the prepared sample (dry coating film) was adhered to the other side of the double-sided tape. Then, the sample was peeled off while being stretched from the bottom to the top at a constant speed (50 mm/min), and the average value of the stresses at that time was taken as the peel strength.

<Volume Resistivity of Electrode Film for Positive Electrode>

The mixture slurry for the positive electrode was applied on an aluminum foil using an applicator in a manner such that the weight per unit area of the electrode was 20 mg/cm² to form a coating film. Next, the coating film was dried in an electric oven at 120° C.±5° C. for 25 minutes.

Next, the surface resistivity (Ω/□) of the dry coating film was measured using Loresta GP MCP-T610 made by Mitsubishi Chemical Analytech Co., Ltd. After the measurement, the thickness of the electrode mixture layer (dry coating film) formed on the aluminum foil was multiplied to obtain the volume resistivity (Ω·cm) of the electrode film for the positive electrode. The thickness of the electrode mixture layer was obtained by subtracting the film thickness of the aluminum foil from the average thickness value obtained by measuring three points in the electrode film using a film thickness gauge (DIGIMICRO MH-15M made by NIKON).

<Peeling Strength of Electrode Film for Positive Electrode>

The mixture slurry for the positive electrode was applied to an aluminum foil using an applicator in a manner such that the weight per unit area of the electrode was 20 mg/cm² to form a coating film. Next, the coating film was dried in an electric oven at 120° C.±5° C. for 25 minutes. Then, with the coating direction as the long axis, the dried coating film was cut into two rectangles of 90 mm×20 mm to obtain samples.

In measuring the peel strength, a bench-top tensile tester (Strograph E3 made by Toyo Seiki Seisaku-sho, Ltd.) was used, and the evaluation was performed by a 180-degree peel test method. Specifically, one side of a double-sided tape (No. 5000NS produced by Nitoms, Inc.) having a size of 100 mm×30 mm was attached to a stainless steel plate, and the battery electrode mixture layer of the prepared sample (dry coating film) was adhered to the other side of the double-sided tape. Then, the sample was peeled off while being stretched from the bottom to the top at a constant speed (50 mm/min), and the average value of the stresses at that time was taken as the peel strength.

<Manufacture of Standard Positive Electrode>

The standard positive electrodes used in the examples and comparative examples described later were produced by the following method.

First, 93 parts by mass of a positive electrode active material (HED (registered trademark) NCM-I 111100 produced by BASF TODA Battery Materials LLC), 4 parts by mass of acetylene black (Denka Black (registered trademark) HS100 produced by Danka Company Limited), and 3 parts by mass of PVDF (polyvinylidene fluoride; Kureha KF Polymer W#1300 produced by Kureha Battery Materials Japan Co., Ltd.) were added to a plastic container with a capacity of 150 cm$^3$, and a spatula was used to mix them until the powder became uniform. Then, 20.5 parts by mass of NMP was added, and the mixture was stirred at 2000 rpm for 30 seconds using a planetary centrifugal mixer (Awatori-Rentaro ARE-310 made by Thinky Ltd.). Then, the mixture in the plastic container was mixed using a spatula to be uniform, and was stirred at 2000 rpm for 30 seconds using the above planetary centrifugal mixer. Furthermore, 14.6 parts by mass of NMP was added, and the mixture was stirred at 2000 rpm for 30 seconds using the above planetary centrifugal mixer. Finally, the mixture was stirred at 3000 rpm for 10 minutes using a high-speed mixer to obtain a mixture slurry for the positive electrode.

Next, the mixture slurry for the positive electrode was applied on an aluminum foil having a thickness of 20 µm as a current collector using an applicator to form a coating film. Next, the coating film was dried at 120° C.±5° C. for 25 minutes in an electric oven, and was adjusted such that the basis weight per unit area of the electrode was 20 mg/cm$^2$. Further, a calendering process was performed with a roll press (3t hydraulic roll press made by THANK METAL Co., Ltd.) to manufacture a standard positive electrode where the mixture layer (dry coating film) had a density of 3.1 g/cm$^3$.

<Evaluation of Rate Characteristic of Lithium Ion Secondary Battery>

The laminate-type lithium ion secondary battery was placed in a thermostat at 25° C., and a charge-discharge measurement was performed using a charge-discharge device (SM-8 made by Hokuto Denko Corporation). Constant-current and constant-voltage charging (cut-off current 1.1 mA (0.02 C)) was performed with a charging current of 11 mA (0.2 C) to an end-of-charge voltage of 4.2 V, and then constant-current discharging was performed at a discharging current of 11 mA (0.2 C) to an end-of-discharge voltage of 2.5 V. After repeating the above operation three times, constant-current and constant-voltage charging (cut-off current (1.1 mA 0.02 C)) was performed with a charging current of 11 mA (0.2 C) to an end-of-charge voltage of 4.2 V, and constant-current discharging was performed at a discharging current of 0.2 C or 3 C until the end-of-discharge voltage of 2.5 V was reached, and the respective discharge capacities were calculated. The rate characteristic was the ratio of the 3 C discharge capacity to the 0.2 C discharge capacity, and can be represented by the following formula 2:

$$\text{Rate characteristic}=3\text{ C discharge capacity}/3^{rd}\text{ 0.2 C discharge capacity}\times 100(\%) \quad \text{Formula 2:}$$

<Evaluation of Cycle Characteristic of Lithium Ion Secondary Battery>

The laminate-type lithium ion secondary battery was placed in a constant temperature room at 25° C., and a charge-discharge device (SM-8 made by Hokuto Denko Corporation) was used for charge-discharge measurement. Constant-current and constant-voltage charging (cut-off current 1.38 mA (0.025 C)) was performed with a charging current of 55 mA (1 C) to an end-of-charge voltage of 4.2 V, and then constant-current discharging was performed at a discharging current of 55 mA (1 C) to an end-of-discharge voltage of 2.5 V. The operation was repeated 200 times. 1 C was the current value at which the theoretical capacity of the positive electrode was discharged in 1 hour. The cycle characteristic was the ratio of the 1 C discharge capacity at the 3$^{rd}$ time to the 1 C discharge capacity at the 200$^{th}$ time at 25° C., and can be represented by the following formula 3:

$$\text{Cycle characteristic}=1\text{ C discharge capacity of }200^{th}\text{ time}/1\text{ C discharge capacity of }3^{rd}\text{ time}\times 100(\%) \quad \text{Formula 3}$$

<2> Synthesis of CNT

The CNT (A) to CNT (E) used in the following examples were prepared by the following methods.

<Synthesis of CNT (A)>

A catalyst for CNT synthesis was prepared by the method described in paragraph [0117] of Japanese Patent Laid-Open No. 2018-150218 (JP2018150218A). Then, a heat-resistant dish made of quartz glass in which 1.0 g of the catalyst for CNT synthesis was dispersed was placed in the center of a lateral reaction tube having an inner volume of 10 L that could be pressurized and heated by an external heater. Gas discharging was made while nitrogen gas was injected to replace the air in the reaction tube with nitrogen gas so that the oxygen concentration in the lateral reaction tube was 1 volume % or less. Next, the lateral reaction tube was heated with an external heater until the center temperature thereof became 680° C. After reaching 680° C., propane gas as a carbon source was introduced into the reaction tube at a flow rate of 2 L per minute, and contact reaction was conducted for 2 hours. After the reaction was completed, the gas in the reaction tube was replaced with nitrogen gas and the temperature of the reaction tube was cooled to 100° C. or lower, and the product was taken out to obtain CNT (A).

<Synthesis of CNT (B)>

A catalyst for CNT synthesis was prepared by the method described in paragraphs [0147] and [0148] of Japanese Patent Laid-Open No. 2019-108256 (JP201910-8256A). Then, in the center part of a lateral reaction tube having an inner volume of 10 L that can be pressurized and heated by an external heater, a heat-resistant plate made of quartz glass in which 1 g of the CNT synthesis catalyst was dispersed was set. Gas discharging was performed while nitrogen gas was injected to replace the air in the reaction tube with nitrogen gas, and the lateral reaction tube was heated until the ambient temperature therein became 700° C. After reaching 700° C., ethylene gas, which is a hydrocarbon, was introduced into the reaction tube at a flow rate of 2 L per minute, and the contact reaction was carried out for 15 minutes. After the reaction was completed, the gas in the reaction tube was replaced with nitrogen gas and the temperature of the reaction tube was cooled to 100° C. or lower, and the product was taken out to obtain CNT (B).

<Synthesis of CNT (C)>

CNT (C) was obtained by the same method as CNT (B) except that ethylene gas was introduced into the reaction tube at a flow rate of 5 L per minute and the contact reaction was carried out for 7 minutes.

<Synthesis of CNT (D)>

10 kg of CNT (C) was weighed into a 120 L heat-resistant container, and the heat-resistant container with the CNT was placed in a furnace. Then, nitrogen gas was introduced into the furnace, and the air in the furnace was exhausted while maintaining a positive pressure. After the oxygen concentration in the furnace reached 0.1% or less, the container was heated to 1600° C. in 30 hours. While maintaining the temperature in the furnace at 1600° C., chlorine gas was introduced at a rate of 50 L/min for 50 hours. Then, nitrogen gas was introduced at 50 L/min while maintaining a positive pressure, and the product was cooled to obtain CNT (D).

<Synthesis of CNT (E)>

10 kg of CNT (B) was weighed into a 120 L heat-resistant container, and the heat-resistant container with the CNT was placed in a furnace. Then, nitrogen gas was introduced into the furnace, and the air in the furnace was exhausted while maintaining a positive pressure. After the oxygen concentration in the furnace reached 0.1% or less, the container was heated to 2000° C. in 30 hours. While maintaining the temperature in the furnace at 2000° C., chlorine gas was introduced at a rate of 50 L/min for 50 hours. Then, nitrogen gas was introduced at 50 L/min while maintaining a positive pressure, and the product was cooled to obtain CNT(E).

Table 1 shows the kinds of CNTs used in the Examples and Comparative Examples, the outer diameters of the CNTs, the specific surface areas of the CNTs, the G/D ratios, volume resistivities, half-value widths, carbon purities, CNT fibers lengths, the products of BET specific surface area and CNT fiber length, and the particle size of carbon black (hereinafter as "CB"). When ZEONANO® SG101 produced by ZEON Nanotechnology Corporation was observed by SEM at a magnification of 5000 times, an image containing more than 10 CNTs in the field of view was not obtained.

TABLE 1

| Kind of CNT | Outer diameter (nm) | BET specific surface area ($m^2/g$) | G/D ratio | Powder resistivity ($\Omega \cdot cm$) | Half-value width (°) | Carbon purity (%) | CNT fiber length (μm) | Product of BET specific surface area and CNT fiber length |
|---|---|---|---|---|---|---|---|---|
| CNT (A) | 9.8 | 350 | 0.85 | $1.8 \times 10^{-2}$ | 3.1 | 98 | 1.9 | 665 |
| CNT (B) | 7.5 | 630 | 0.71 | $1.8 \times 10^{-2}$ | 5.3 | 95 | 1.5 | 945 |
| CNT (C) | 6.3 | 680 | 0.73 | $1.7 \times 10^{-2}$ | 5.5 | 92 | 1.3 | 884 |
| CNT (D) | 6.9 | 530 | 2.1 | $2.0 \times 10^{-2}$ | 4.8 | 99.9 | 1.3 | 689 |
| CNT (E) | 7.1 | 440 | 3.8 | $2.5 \times 10^{-2}$ | 4.1 | 99.9 | 1.2 | 528 |
| 100P produced by Kumho Petrochemical Co., Ltd. | 14 | 220 | 0.96 | $1.6 \times 10^{-2}$ | 2.6 | 97 | 1.1 | 242 |
| JENOTUBE 8S produced by JEIO Co., Ltd. | 6.8 | 750 | 0.83 | $1.5 \times 10^{-2}$ | 4.7 | 98 | 1 | 750 |
| Millimeter-order CNT produced by TPR Co., Ltd. | 5~12 | 230 | 0.85 | $1.2 \times 10^{-2}$ | 3.9 | 99.9 | 7.5 | 1725 |
| NC7000 produced by Nanocyl SA. | 10 | 210 | 0.91 | $1.7 \times 10^{-2}$ | 2.7 | 90 | 1.1 | 231 |
| AMC (trademark) produced by Ube Industries, Ltd. | 5~15 | 170 | 0.96 | $2.6 \times 10^{-2}$ | 2.7 | 98 | 0.6 | 102 |
| VGCF-H produced by Showa Denko K.K. | 150 | 10 | 7.2 | $1.5 \times 10^{-2}$ | 0.6 | 95 | 5 | 50 |
| TUBALL SWCNT 93% produced by OCSiAL company | 1.2~2.0 | 980 | 39 | $2.4 \times 10^{-3}$ | — | 99 | 4.5 | 4410 |
| ZEONANO (trademark) SG101 produced by ZEON Nanotechnology Corporation | 3~5 | 850 | 6.1 | — | — | 99 | — | — |

| Kind of CB | Particle size of CB (nm) | BET specific surface area ($m^2/g$) | G/D ratio | Powder resistivity ($\Omega \cdot cm$) | Half-value width (°) | Carbon purity (%) |
|---|---|---|---|---|---|---|
| Ketjenblack EC300J from Lion Specialty Chemicals Co., Ltd. | 39.5 | 800 | — | $1.5 \times 10^{-2}$ | — | 99 |

<3> Dispersant

<Synthesis of Dispersant (Y)>

100 parts of acetonitrile were charged into a reaction vessel including a gas introduction tube, a thermometer, a condenser and a stirrer, and the air was replaced with nitrogen gas. The inside of the reaction vessel was heated to 75° C., and a mixture of 90.0 parts of acrylonitrile, 10.0 parts of acrylic acid, and 5.0 parts of 2,2'-azobis(2,4-dimethylvaleronitrile) (V-65 produced by NOF Corporation) were added dropwise in 3 hours to conduct a polymerization reaction. After the dropwise addition is completed, the reaction was further carried out at 75° C. for 1 hour, 0.5 part of Perbutyl O was added, and the reaction was continued at 75° C. for 1 hour. Then, the conversion rate was confirmed to exceed 98% by non-volatile content measurement, and the dispersion medium was completely removed by concentration under a reduced pressure to obtain a dispersant (Y). The weight average molecular weight (Mw) of the dispersant (Y) was 45,000.

The dispersants used in the Examples, the Comparative Examples and Reference Example are shown in Table 2.

TABLE 2

| Dispersant | Kind of dispersant |
|---|---|
| A | Polyvinylpyrrolidone (K-30 produced by Nippon Shokubai Co., Ltd.) |
| B | Carboxymethyl cellulose ammonium salt (Metolose (trademark) SM-4 produced by SHINETSU INDUSTORY CORPORATION) |
| C | Carboxymethyl cellulose sodium salt (Sunrose (trademark) F01MC produced by Nippon Paper Industries Co., Ltd.) |
| D | Anion-modified polyvinyl alcohol (Kuraray Poval SD1000 produced by Kuraray Co., Ltd.) |
| X | Carboxymethyl cellulose (APP-084 produced by Nippon Paper Industries Co., Ltd.) |
| Y | Copolymer of acrylonitrile and acrylic acid |

<4> CNT Dispersion Liquid

Example 1

In a stainless steel container, 98.45 parts of ion-exchanged water, 0.5 part of dispersant (A), 0.05 part of an antifoaming agent (SN Defoamer 1312 produced by SAN NOPCO Ltd.), and the mixture was stirred with a disperser until it became homogeneous. Then, 1 part of CNT (A) was added while stirring with the disperser, and the mixture was stirred with the disperser until it became uniform. After that, a dispersion treatment was performed using a high-pressure homogenizer (Star Burst 10 made by Sugino Machine Ltd.). The dispersion treatment used a single-nozzle chamber, and was performed for five passes at a nozzle diameter of 0.17 mm and a pressure of 100 MPa to obtain a CNT dispersion liquid (A1).

Examples 2 to 22 and Comparative Examples 1 to 4

The kind of CNT, addition amount of CNT, kind of dispersant, addition amount of dispersant, addition amount of antifoaming agent, addition amount of ion-exchange water, number of times of passage, and dispersion pressure described in Example 1 were changed to those shown in Table 3. Except for this, CNT dispersion liquids (A2) to (M1) were obtained using the same method as Example 1.

TABLE 3

| | CNT dispersion liquid | CNT Kind | CNT Addition amount of CNT (part) | Dispersant Kind | Dispersant Addition amount (part) | Antifoaming agent Addition amount (part) | Ion-exchanged water Addition amount (part) |
|---|---|---|---|---|---|---|---|
| Example 1 | A1 | CNT (A) | 1 | A | 0.5 | 0.05 | 98.45 |
| Example 2 | A2 | CNT (A) | 1.5 | A | 0.75 | 0.05 | 97.7 |
| Example 3 | A3 | CNT (A) | 2 | A | 1 | 0.05 | 96.95 |
| Example 4 | A4 | CNT (A) | 1 | A | 0.3 | 0.05 | 98.65 |
| Example 5 | A5 | CNT (A) | 1 | A | 0.7 | 0.05 | 98.25 |
| Example 6 | A6 | CNT (A) | 1 | A | 1.0 | 0.05 | 97.95 |
| Example 7 | A7 | CNT (A) | 1 | B | 0.5 | 0.05 | 98.45 |
| Example 8 | A8 | CNT (A) | 1 | C | 0.5 | 0.05 | 98.45 |
| Example 9 | A9 | CNT (A) | 1 | D | 0.5 | 0.05 | 98.45 |
| Example 10 | AX | CNT (A) | 1 | X | 0.5 | 0 | 98.5 |
| Example 11 | AY | CNT (A) | 1 | Y | 0.5 | 0 | 98.5 |
| Example 12 | B1 | CNT (B) | 1 | A | 0.5 | 0.05 | 98.45 |
| Example 13 | C1 | CNT (C) | 1 | A | 0.5 | 0.05 | 98.45 |
| Example 14 | CY1 | CNT (C) | 1 | Y | 0.5 | 0 | 98.5 |
| Example 15 | CY2 | CNT (C) | 1 | Y | 0.5 | 0 | 98.5 |
| Example 16 | CY3 | CNT (C) | 1 | Y | 0.5 | 0 | 98.5 |

| | CNT concentration | Amount of dispersant (relative to CNT concentration) | Number of passes | Dispersion pressure (MPa) |
|---|---|---|---|---|
| Example 1 | 1.0% | 50% | 5 | 100 |
| Example 2 | 1.5% | 50% | 7 | 100 |
| Example 3 | 2.0% | 50% | 10 | 100 |
| Example 4 | 1.0% | 30% | 5 | 100 |
| Example 5 | 1.0% | 70% | 5 | 100 |
| Example 6 | 1.0% | 100% | 5 | 100 |
| Example 7 | 1.0% | 50% | 5 | 100 |
| Example 8 | 1.0% | 50% | 5 | 100 |
| Example 9 | 1.0% | 50% | 5 | 100 |
| Example 10 | 1.0% | 50% | 5 | 100 |
| Example 11 | 1.0% | 50% | 5 | 100 |
| Example 12 | 1.0% | 50% | 5 | 100 |
| Example 13 | 1.0% | 50% | 5 | 100 |
| Example 14 | 1.0% | 50% | 5 | 60 |
| Example 15 | 1.0% | 50% | 5 | 100 |
| Example 16 | 1.0% | 50% | 5 | 150 |

TABLE 3-continued

|  | CNT dispersion liquid | CNT Kind | CNT Addition amount of CNT (part) | Dispersant Kind | Dispersant Addition amount (part) | Anti-foaming agent Addition amount (part) | Ion-exchanged water Addition amount (part) |
|---|---|---|---|---|---|---|---|
| Example 17 | D1 | CNT (D) | 1 | A | 0.5 | 0.05 | 98.45 |
| Example 18 | E1 | CNT (E) | 1 | A | 0.5 | 0.05 | 98.45 |
| Example 19 | F1 | 100P produced by Kumho Petrochemical Co., Ltd. | 3 | A | 1.5 | 0.05 | 95.45 |
| Example 20 | G1 | JENOTUBE 8S produced by JEIO Co., Ltd. | 1 | A | 0.5 | 0.05 | 98.45 |
| Example 21 | H1 | Millimeter-order CNT produced by TPR Co., Ltd. | 0.5 | A | 0.5 | 0.05 | 98.95 |
| Example 22 | I1 | NC7000 produced by Nanocyl SA. | 3 | A | 1.5 | 0.05 | 95.45 |
| Comparative Example 1 | J1 | AMC (trademark) produced by Ube Industries, Ltd. | 3 | A | 1.5 | 0.05 | 95.45 |
| Comparative Example 2 | K1 | VGCF-H produced by Showa Denko K.K. | 3 | A | 1.5 | 0.05 | 95.45 |
| Comparative Example 3 | L1 | TUBALL SWCNT 93% produced by OCSiAL company | 0.5 | A | 0.5 | 0.05 | 98.95 |
| Comparative Example 4 | M1 | ZEONANO (trademark) SG101 produced by ZEON Nanotechnology Corporation | 0.5 | A | 0.5 | 0.05 | 98.95 |

|  | CNT concentration | Amount of dispersant (relative to CNT concentration) | Number of passes | Dispersion pressure (MPa) |
|---|---|---|---|---|
| Example 17 | 1.0% | 50% | 5 | 100 |
| Example 18 | 1.0% | 50% | 5 | 100 |
| Example 19 | 3.0% | 50% | 5 | 100 |
| Example 20 | 1.0% | 50% | 5 | 100 |
| Example 21 | 0.5% | 100% | 5 | 100 |
| Example 22 | 3.0% | 50% | 5 | 100 |
| Comparative Example 1 | 3.0% | 50% | 5 | 100 |
| Comparative Example 2 | 3.0% | 50% | 5 | 100 |
| Comparative Example 3 | 0.5% | 100% | 5 | 100 |
| Comparative Example 4 | 0.5% | 100% | 5 | 100 |

Example 23

1.0 part of CNT (A), 0.5 part of dispersant (A), 0.05 part of an antifoaming agent (SN Defoamer 1312 produced by SAN NOPCO Ltd.), 98.45 parts of ion-exchanged water, and 140 parts of zirconia beads (bead diameter: 0.3 mmφ) were charged into a glass bottle (M-140 produced by HAKUYO GLASS Co., Ltd.), and a paint conditioner made by Red Devil, Inc. was used to perform a dispersion treatment for 8 hours. Next, the zirconia beads were separated to obtain a CNT dispersion liquid (A10).

Examples 24 to 29 and Comparative Examples 5 to 7

The kind of CNT, kind of CB, addition amount of CNT, kind of dispersant, addition amount of dispersant, addition amount of antifoaming agent, addition amount of ion-exchange water and dispersion time described in Example 23 were changed to those shown in Table 4. Except for this, CNT dispersion liquids (A10) to (M2) were obtained using the same method as Example 23.

TABLE 4

|  | CNT dispersion liquid | CNT Kind | Addition amount of CNT (part) | Dispersant Kind | Addition amount (part) | Antifoaming agent Addition amount (part) |
|---|---|---|---|---|---|---|
| Example 23 | A10 | CNT (A) | 1 | A | 0.5 | 0.05 |
| Example 24 | C2 | CNT (C) | 1 | A | 0.5 | 0.05 |
| Example 25 | H2 | Millimeter-order CNT produced by TPR Co., Ltd. | 0.5 | A | 0.5 | 0.05 |
| Example 26 | H3 | Millimeter-order CNT produced by TPR Co., Ltd. | 0.5 | A | 0.5 | 0.05 |
| Example 27 | H4 | Millimeter-order CNT produced by TPR Co., Ltd. | 0.5 | A | 0.5 | 0.05 |
| Example 28 | H5 | Millimeter-order CNT produced by TPR Co., Ltd. | 0.5 | A | 0.5 | 0.05 |
| Example 29 | H6 | Millimeter-order CNT produced by TPR Co., Ltd. | 0.5 | A | 0.5 | 0.05 |
| Comparative Example 5 | I2 | NC7000 produced by Nanocyl SA. | 3 | A | 1.5 | 0.05 |
| Comparative Example 6 | M2 | ZEONANO (trademark) SG101 produced by ZEON Nanotechnology Corporation | 0.5 | A | 0.5 | 0.05 |

|  | Ion-exchanged water Addition amount (part) | CNT concentration | Amount of dispersant (relative to CNT concentration) | Dispersion time (hour) |
|---|---|---|---|---|
| Example 23 | 98.45 | 1.0% | 50% | 8 |
| Example 24 | 98.45 | 1.0% | 50% | 8 |
| Example 25 | 98.95 | 0.5% | 100% | 8 |
| Example 26 | 98.95 | 0.5% | 100% | 6 |
| Example 27 | 98.95 | 0.5% | 100% | 4 |
| Example 28 | 98.95 | 0.5% | 100% | 2 |
| Example 29 | 98.95 | 0.5% | 100% | 1 |
| Comparative Example 5 | 95.45 | 3.0% | 50% | 8 |
| Comparative Example 6 | 98.95 | 0.5% | 100% | 8 |

TABLE 4-continued

| | CB dispersion liquid | CNT Kind | CNT Addition amount of CB (part) | Dispersant Kind | Dispersant Addition amount (part) | Anti-foaming agent Addition amount (part) | Ion-exchanged water Addition amount (part) | CB concentration | Amount of dispersant (relative to CNT concentration) | Dispersion time (hour) |
|---|---|---|---|---|---|---|---|---|---|---|
| Comparative Example 7 | N1 | Ketjenblack EC300J from Lion Specialty Chemicals Co., Ltd. | 5 | A | 0.5 | 0.05 | 94.45 | 5.0% | 10% | 8 |

Example 30

1.0 part of CNT (A), 0.5 part of dispersant (A), 98.5 parts of NMP and 140 parts of zirconia beads (bead diameter: 0.3 mmφ) were charged in a glass bottle (M-140 produced by HAKUYO GLASS Co., Ltd.), and a paint conditioner made by Red Devil, Inc. was used to perform a dispersion treatment for 8 hours. Next, the zirconia beads were separated to obtain a CNT dispersion liquid (A11).

Comparative Example 8

1.0 part of NC7000 produced by Nanocyl SA., 0.5 part of dispersant (A), 98.5 parts of NMP, and 140 parts of zirconia beads (bead size: 0.3 mmφ) were charged into a glass bottle (M-140 produced by HAKUYO GLASS Co., Ltd.), and a paint conditioner made by Red Devil, Inc. was used to perform a dispersion treatment for 8 hours. Next, the zirconia beads were separated to obtain a CNT dispersion liquid (I3).

The evaluation results of the CNT dispersion liquids prepared in Examples 1 to 30 and Comparative Examples 1 to 8 are shown in Table 5. The criteria for each evaluation of the CNT dispersion are described below.

TABLE 5

| | CNT dispersion liquid | CNT concentration | Amount of dispersant (relative to CNT concentration) | Evaluation of viscosity | CNT fiber length (μm) | pH | Cumulative particle size D50 (nm) | Complex elastic modulus | Phase angle |
|---|---|---|---|---|---|---|---|---|---|
| Example 1 | A1 | 1.0% | 50% | +++ | 1.2 | 8.4 | 1200 | + | +++ |
| Example 2 | A2 | 1.5% | 50% | ++ | 1.3 | 8.2 | 1500 | ++ | +++ |
| Example 3 | A3 | 2.0% | 50% | + | 1.2 | 8 | 1400 | +++ | ++ |
| Example 4 | A4 | 1.0% | 30% | ++ | 1.4 | 8.6 | 1800 | ++ | +++ |
| Example 5 | A5 | 1.0% | 70% | +++ | 1.0 | 7.6 | 1400 | + | +++ |
| Example 6 | A6 | 1.0% | 100% | +++ | 1.1 | 6.5 | 1500 | ++ | +++ |
| Example 7 | A7 | 1.0% | 50% | ++ | 1.4 | 8.3 | 1200 | ++ | +++ |
| Example 8 | A8 | 1.0% | 50% | ++ | 1.2 | 8.9 | 1300 | ++ | +++ |
| Example 9 | A9 | 1.0% | 50% | ++ | 1.1 | 10.6 | 1300 | ++ | +++ |
| Example 10 | AX | 1.0% | 50% | +++ | 1.6 | 10 | 1000 | ++++ | ++ |
| Example 11 | AY | 1.0% | 50% | +++ | 1.5 | 9.1 | 1100 | ++++ | ++ |
| Example 12 | B1 | 1.0% | 50% | ++ | 1.5 | 8.4 | 1800 | ++ | +++ |
| Example 13 | C1 | 1.0% | 50% | ++ | 1.5 | 8.3 | 1600 | ++ | +++ |
| Example 14 | CY1 | 1.0% | 50% | ++ | 1.7 | 9.2 | 1500 | +++ | +++ |
| Example 15 | CY2 | 1.0% | 50% | +++ | 1.6 | 9.2 | 800 | ++++ | ++ |
| Example 16 | CY3 | 1.0% | 50% | + | 1.4 | 9.2 | 500 | ++ | +++ |
| Example 17 | D1 | 1.0% | 50% | +++ | 1.8 | 8.5 | 1200 | ++ | +++ |
| Example 18 | E1 | 1.0% | 50% | +++ | 2.1 | 8.5 | 1100 | ++ | +++ |
| Example 19 | F1 | 3.0% | 50% | ++ | 0.8 | 6.5 | 1200 | ++ | +++ |
| Example 20 | G1 | 1.0% | 50% | ++ | 0.8 | 8.2 | 1300 | ++ | +++ |
| Example 21 | H1 | 0.5% | 50% | + | 3.5 | 8.4 | 2800 | ++++ | + |
| Example 22 | I1 | 3.0% | 50% | + | 0.8 | 8.1 | 960 | ++++ | + |
| Example 23 | A10 | 1.0% | 50% | +++ | 1.3 | 8.1 | 700 | + | +++ |
| Example 24 | C2 | 1.0% | 50% | +++ | 1.0 | 8.2 | 930 | + | +++ |
| Example 25 | H2 | 0.5% | 50% | ++ | 0.8 | 8.2 | 720 | ++ | + |

TABLE 5-continued

| | | | | | | | | | |
|---|---|---|---|---|---|---|---|---|---|
| Example 26 | H3 | 0.5% | 50% | + | 1.6 | 8.3 | 2500 | +++ | + |
| Example 27 | H4 | 0.5% | 50% | + | 2.1 | 8.4 | 2800 | +++ | ++ |
| Example 28 | H5 | 0.5% | 50% | + | 2.6 | 8.3 | 3900 | +++ | ++ |
| Example 29 | H6 | 0.5% | 50% | + | 3.2 | 8.5 | 3500 | +++ | +++ |
| Example 30 | A11 | 1.0% | 50% | +++ | 1.2 | 11 | 400 | + | +++ |
| Comparative Example 1 | J1 | 3.0% | 50% | +++ | 0.5 | 6 | 600 | + | +++ |
| Comparative Example 2 | K1 | 3.0% | 50% | +++ | 4.0 | 6.1 | 1000 | + | +++ |
| Comparative Example 3 | L1 | 0.5% | 50% | − | 3.8 | 8.5 | 3100 | − | − |
| Comparative Example 4 | M1 | 0.5% | 50% | − | — | 8.3 | 2700 | − | − |
| Comparative Example 5 | I2 | 3.0% | 50% | ++ | 0.5 | 6.8 | 550 | ++ | +++ |
| Comparative Example 6 | M2 | 0.5% | 50% | − | — | 8.3 | 3500 | − | − |
| Comparative Example 8 | I3 | 1.0% | 50% | +++ | 0.4 | 11.1 | 750 | ++ | +++ |

| | CB dispersion liquid | CB concentration | Amount of dispersant (relative to CNT concentration) | Evaluation of viscosity | CB particle size of CB dispersion liquid | pH of CB dispersion liquid | Cumulative particle size D50 of CB dispersion liquid (nm) |
|---|---|---|---|---|---|---|---|
| Comparative Example 7 | N1 | 5.0% | 50% | +++ | | 5.8 | 880 |

(Viscosity)
+++ (excellent): less than 500 mPa · s.
++ (good): 500 mPa · s or more and less than 2000 mPa · s.
+ (acceptable): 2000 mPa · s or more and less than 10000 mPa · s.
− (bad): 10000 mPa · s or more; visible sedimentation or separation.
(Complex elastic modulus)
++++ (most excellent): 30 Pa or more and less than 50 Pa
+++ (excellent): 20 Pa or more and less than 30 Pa
++ (good): 10 Pa or more and less than 20 Pa
+ (acceptable): less than 10 Pa
− (unacceptable): regarded as poor dispersion when the complex elastic modulus exceeded 50 Pa.
(Phase angle)
+++ (excellent): 30° or more and 50° or less.
++ (good): 20° or more and less than 30°.
+ (acceptable): 10° or more and less than 20°.
− (unacceptable): less than 10°.

<5> Preparation of CNT Resin Composition and Mixture Slurry

Example 31

7.5 parts by mass of the CNT dispersion liquid (A1), 12.5 parts by mass of an aqueous solution obtained by dissolving carboxymethyl cellulose (CMC) (#1190 produced by Daicel FineChem Ltd.) in a concentration of 2 mass %, and 4.9 parts by mass of ion-exchanged water were weighed in a plastic container with a capacity of 150 cm$^3$. Then, the mixture was stirred at 2000 rpm for 30 second using a planetary centrifugal mixer (Awatori-Rentaro ARE-310 made by Thinky Ltd.) to obtaining a CNT resin composition (A1).

Then, 2.4 parts by mass of silicon monoxide (SILICON MONOOXIDE produced by Osaka Titanium Technologies Co., Ltd., SiO 1.3C, 5 μm) was added, and the above planetary centrifugal mixer was used to stir the mixture at 2000 rpm for 30 seconds. Further, 21.9 parts by mass of an artificial graphite (CGB-20 produced by Nippon Graphite Industries, Ltd.) was added, and the mixture was stirred at 2000 rpm for 30 seconds using the above planetary centrifugal mixer.

Thereafter, 0.78 part by mass of a styrene butadiene emulsion (TRD2001 produced by JSR Corporation), and the mixture was stirred at 2000 rpm for 30 seconds using the above planetary centrifugal to obtain a mixture slurry (A1) for a negative electrode.

Examples 32 to 59 and Comparative Examples 9 to 15

Except that the CNT dispersion liquid and the CB dispersion liquid in Example 31 were changed to those shown in Table 6, and the addition amounts of the CNT resin composition, the CNT dispersion liquid and the CB dispersion liquid were adjusted such that CNT and CB were present in an amount of 0.3 part by mass in 100 parts by mass of the mixture slurry, the mixture slurries (A2) to (N1) for negative electrodes were obtained by the same method as Example 31.

TABLE 6

| | Mixture slurry for negative electrode | CNT resin composition | CNT dispersion liquid |
|---|---|---|---|
| Example 31 | A1 | A1 | A1 |
| Example 32 | A2 | A2 | A2 |
| Example 33 | A3 | A3 | A3 |
| Example 34 | A4 | A4 | A4 |
| Example 35 | A5 | A5 | A5 |
| Example 36 | A6 | A6 | A6 |
| Example 37 | A7 | A7 | A7 |

TABLE 6-continued

| | | | |
|---|---|---|---|
| Example 38 | A8 | A8 | A8 |
| Example 39 | A9 | A9 | A9 |
| Example 40 | AX | AX | AX |
| Example 41 | AY | AY | AY |
| Example 42 | B1 | B1 | B1 |
| Example 43 | C1 | C1 | C1 |
| Example 44 | CY1 | CY1 | CY1 |
| Example 45 | CY2 | CY2 | CY2 |
| Example 46 | CY3 | CY3 | CY3 |
| Example 47 | D1 | D1 | D1 |
| Example 48 | E1 | E1 | E1 |
| Example 49 | F1 | F1 | F1 |
| Example 50 | G1 | G1 | G1 |
| Example 51 | H1 | H1 | H1 |
| Example 52 | I1 | I1 | I1 |
| Example 53 | A10 | A10 | A10 |
| Example 54 | C2 | C2 | C2 |
| Example 55 | H2 | H2 | H2 |
| Example 56 | H3 | H3 | H3 |
| Example 57 | H4 | H4 | H4 |
| Example 58 | H5 | H5 | H5 |
| Example 59 | H6 | H6 | H6 |
| Comparative Example 9 | J1 | J1 | J1 |
| Comparative Example 10 | K1 | K1 | K1 |
| Comparative Example 11 | L1 | L1 | L1 |
| Comparative Example 12 | M1 | M1 | M1 |
| Comparative Example 13 | I2 | I2 | I2 |
| Comparative Example 14 | M2 | M2 | M2 |

| | Mixture slurry for negative electrode | CB resin composition | CB dispersion liquid |
|---|---|---|---|
| Comparative Example 15 | N1 | N1 | N1 |

Example 60

7.0 parts by mass of NMP in which PVDF (polyvinylidene fluoride) (Solef #5130 produced by Solvay S.A.) was dissolved in 8 mass % was weighed into a plastic container with a capacity of 150 cm$^3$. Then, 18.7 parts by mass of the CNT dispersion liquid (A11) was added, and a planetary centrifugal mixer (Awatori-Rentaro ARE-310) was used to stir at 2000 rpm for 30 seconds to obtain a CNT resin composition (A11).
After that, 36.9 parts of a positive electrode active material (HED (registered trademark) NCM-1111100 produced by BASF TODA Battery Materials LLC) was added, and a planetary centrifugal mixer (Awatori-Rentaro ARE-310) was used to stir at 2000 rpm for 2.5 minutes to obtain a mixture slurry (A11) for a positive electrode.

Comparative Example 16

The CNT dispersion liquid (I3) was used in replacement of the CNT dispersion liquid (A11) in Example 60. Except for this, a CNT resin composition (I3) and a mixture slurry (I3) for the positive electrode were obtained by the same method as Example 60.

<6> Production and Evaluation of Electrode Film
<6-1> Electrode Film for Negative Electrode Example 61

The mixture slurry (A1) for a negative electrode was applied on a copper foil using an applicator such that the weight per unit area of the electrode was 8 mg/cm$^2$. Next, the coating film was dried at 120° C.±5° C. for 25 minutes in an electric oven to obtain an electrode film (A1).

Examples 62 to 89 and Comparative Examples 17 to 23

Except that the negative electrode mixture slurry was changed to those shown in Table 7, electrode films (A2) to (M2) were obtained by the same method as Example 61. The mixture slurry (L1) for a negative electrode could not be used to manufacture an electrode film (L1) for having a high viscosity of mixture slurry.

TABLE 7

| | Electrode film | Mixture slurry for negative electrode | CNT resin composition | CNT dispersion liquid |
|---|---|---|---|---|
| Example 61 | A1 | A1 | A1 | A1 |
| Example 62 | A2 | A2 | A2 | A2 |
| Example 63 | A3 | A3 | A3 | A3 |
| Example 64 | A4 | A4 | A4 | A4 |
| Example 65 | A5 | A5 | A5 | A5 |
| Example 66 | A6 | A6 | A6 | A6 |
| Example 67 | A7 | A7 | A7 | A7 |
| Example 68 | A8 | A8 | A8 | A8 |
| Example 69 | A9 | A9 | A9 | A9 |
| Example 70 | AX | AX | AX | AX |
| Example 71 | AY | AY | AY | AY |
| Example 72 | B1 | B1 | B1 | B1 |
| Example 73 | C1 | C1 | C1 | C1 |
| Example 74 | CY1 | CY1 | CY1 | CY1 |
| Example 75 | CY2 | CY2 | CY2 | CY2 |
| Example 76 | CY3 | CY3 | CY3 | CY3 |
| Example 77 | D1 | D1 | D1 | D1 |
| Example 78 | E1 | E1 | E1 | E1 |
| Example 79 | F1 | F1 | F1 | F1 |
| Example 80 | G1 | G1 | G1 | G1 |
| Example 81 | H1 | H1 | H1 | H1 |
| Example 82 | I1 | I1 | I1 | I1 |
| Example 83 | A10 | A10 | A10 | A10 |
| Example 84 | C2 | C2 | C2 | C2 |
| Example 85 | H2 | H2 | H2 | H2 |
| Example 86 | H3 | H3 | H3 | H3 |
| Example 87 | H4 | H4 | H4 | H4 |
| Example 88 | H5 | H5 | H5 | H5 |
| Example 89 | H6 | H6 | H6 | H6 |
| Comparative Example 17 | J1 | J1 | J1 | J1 |
| Comparative Example 18 | K1 | K1 | K1 | K1 |
| Comparative Example 19 | | L1 | L1 | L1 |
| Comparative Example 20 | M1 | M1 | M1 | M1 |
| Comparative Example 21 | I2 | I2 | I2 | I2 |
| Comparative Example 22 | M2 | M2 | M2 | M2 |
| Comparative Example 23 | N1 | N1 | N1 | N1 |

The evaluation results of the electrode films prepared using the mixture slurries of Examples 61 to 89 and Comparative Examples 17 to 23 are shown in Table 8. The evaluation criteria are described below.

TABLE 8

| | Electrode film | Volume resistivity of electrode film (Ω·cm) | Peel strength (N/cm) | Evaluation of conductivity | Evaluation of adhesion |
|---|---|---|---|---|---|
| Example 61 | A1 | 0.18 | 0.35 | ++ | + |
| Example 62 | A2 | 0.19 | 0.33 | ++ | + |
| Example 63 | A3 | 0.21 | 0.32 | + | + |
| Example 64 | A4 | 0.17 | 0.35 | ++ | + |
| Example 65 | A5 | 0.23 | 0.37 | + | + |
| Example 66 | A6 | 0.25 | 0.30 | + | + |
| Example 67 | A7 | 0.17 | 0.40 | ++ | ++ |
| Example 68 | A8 | 0.18 | 0.38 | ++ | + |
| Example 69 | A9 | 0.19 | 0.35 | ++ | + |
| Example 70 | AX | 0.15 | 0.41 | +++ | ++ |
| Example 71 | AY | 0.15 | 0.40 | +++ | ++ |
| Example 72 | B1 | 0.15 | 0.51 | ++ | +++ |
| Example 73 | C1 | 0.13 | 0.53 | +++ | +++ |
| Example 74 | CY1 | 0.13 | 0.65 | +++ | +++ |
| Example 75 | CY2 | 0.12 | 0.58 | +++ | +++ |
| Example 76 | CY3 | 0.12 | 0.55 | ++ | +++ |
| Example 77 | D1 | 0.15 | 0.53 | ++ | +++ |
| Example 78 | E1 | 0.14 | 0.55 | +++ | +++ |
| Example 79 | F1 | 0.28 | 0.30 | + | + |
| Example 80 | G1 | 0.25 | 0.32 | + | + |
| Example 81 | H1 | 0.13 | 0.59 | +++ | +++ |
| Example 82 | I1 | 0.28 | 0.33 | + | + |
| Example 83 | A10 | 0.23 | 0.35 | + | + |
| Example 84 | C2 | 0.25 | 0.35 | + | + |
| Example 85 | H2 | 0.28 | 0.35 | + | + |
| Example 86 | H3 | 0.25 | 0.38 | + | + |
| Example 87 | H4 | 0.2 | 0.43 | + | ++ |
| Example 88 | H5 | 0.18 | 0.45 | ++ | ++ |
| Example 89 | H6 | 0.15 | 0.50 | ++ | +++ |
| Comparative Example 17 | J1 | 0.63 | 0.26 | − | − |
| Comparative Example 18 | K1 | 0.8 | 0.39 | − | + |
| Comparative Example 19 | | | | | |
| Comparative Example 20 | M1 | 0.42 | 0.35 | − | + |
| Comparative Example 21 | I2 | 0.5 | 0.28 | − | − |
| Comparative Example 22 | M2 | 0.48 | 0.31 | − | + |
| Comparative Example 23 | N1 | 0.92 | 0.25 | − | − |

(Electrical conductivity)
+++ (excellent): volume resistivity (Ω·cm) of electrode film being less than 0.15.
++ (good): volume resistivity (Ω·cm) of electrode film being 0.15 or more and less than 0.2.
+ (acceptable): volume resistivity (Ω·cm) of electrode film being 0.2 or more and less than 0.3.
− (unacceptable): volume resistivity (Ω·cm) of electrode film being 0.3 or more.
(Adhesion)
+++ (excellent): peel strength (N/cm) being 0.5 or more.
++ (good): peel strength (N/cm) being 0.4 or more and less than 0.5.
+ (acceptable): peel strength (N/cm) being 0.3 or more and less than 0.4.
− (unacceptable): peel strength (N/cm) being less than 0.3.

<6-2> Electrode Film for Positive Electrode

Example 90

The mixture slurry (A11) for a positive electrode was applied to an aluminum foil using an applicator such that the weight per unit area of the electrode was 20 mg/cm², and the coating film was dried in an electric oven at 120° C.±5° C. for 25 minutes to obtain an electrode film (A11).

Comparative Example 24

The mixture slurry (I3) for a positive electrode was applied to an aluminum foil using an applicator such that the weight per unit area of the electrode was 20 mg/cm², and the coating film was dried in an electric oven at 120° C.±5° C. for 25 minutes to obtain an electrode film (I3).

The evaluation results of the electrode films produced using the mixture slurries of Example 90 and Comparative Example 24 are shown in Table 9. The evaluation criteria are described below.

TABLE 9

| | Electrode film | Volume resistivity of electrode film (Ω·cm) | Peel strength (N/cm) | Evaluation of conductivity | Evaluation of adhesion |
|---|---|---|---|---|---|
| Example 90 | A11 | 7.6 | 0.38 | ++ | ++ |
| Comparative Example 24 | I3 | 18.9 | 0.12 | − | − |

(Electrical conductivity)
++ (good): volume resistivity (Ω·cm) of electrode film being less than 10.
+ (acceptable): volume resistivity (Ω·cm) of electrode film being 10 or more and less than 15.
− (unacceptable): volume resistivity (Ω·cm) of electrode film being 15 or more.
(Adhesion)
++ (good): peel strength (N/cm) being 0.3 or more.
+ (acceptable): peel strength (N/cm) being 0.2 or more and less than 0.3.
− (unacceptable): peel strength (N/cm) being less than 0.2.

<7> Electrode

Example 91

A calendering treatment was performed to the electrode film (A1) using a roll press (3t hydraulic roll press made by THANK METAL Co., Ltd.) to manufacture a negative electrode where the density of the mixture layer became 1.6 g/cm³.

Examples 92 to 119 and Comparative Examples 25 to 30

Except that the electrode film in Example 91 was changed to those described in Table 10, negative electrodes were manufactured by the same method as Example 91.

TABLE 10

| | Electrode film | Negative electrode | Density of mixture layer (g/cc) |
|---|---|---|---|
| Example 91 | A1 | A1 | 1.6 |
| Example 92 | A2 | A2 | 1.6 |
| Example 93 | A3 | A3 | 1.6 |
| Example 94 | A4 | A4 | 1.6 |
| Example 95 | A5 | A5 | 1.6 |
| Example 96 | A6 | A6 | 1.6 |
| Example 97 | A7 | A7 | 1.6 |
| Example 98 | A8 | A8 | 1.6 |
| Example 99 | A9 | A9 | 1.6 |
| Example 100 | AX | AY | 1.6 |
| Example 101 | AX | AY | 1.6 |
| Example 102 | B1 | B1 | 1.6 |
| Example 103 | C1 | C1 | 1.6 |
| Example 104 | CY1 | CY1 | 1.6 |
| Example 105 | CY2 | CY2 | 1.6 |
| Example 106 | CY3 | CY3 | 1.6 |
| Example 107 | D1 | D1 | 1.6 |
| Example 108 | E1 | E1 | 1.6 |
| Example 109 | F1 | F1 | 1.6 |
| Example 110 | G1 | G1 | 1.6 |
| Example 111 | H1 | H1 | 1.6 |
| Example 112 | I1 | I1 | 1.6 |
| Example 113 | A10 | A10 | 1.6 |
| Example 114 | C2 | C2 | 1.6 |
| Example 115 | H2 | H2 | 1.6 |

TABLE 10-continued

|  | Electrode film | Negative electrode | Density of mixture layer (g/cc) |
|---|---|---|---|
| Example 116 | H3 | H3 | 1.6 |
| Example 117 | H4 | H4 | 1.6 |
| Example 118 | H5 | H5 | 1.6 |
| Example 119 | H6 | H6 | 1.6 |
| Comparative Example 25 | J1 | J1 | 1.6 |
| Comparative Example 26 | K1 | K1 | 1.6 |
| Comparative Example 27 | M1 | M1 | 1.6 |
| Comparative Example 28 | I2 | I2 | 1.6 |
| Comparative Example 29 | M2 | M2 | 1.6 |
| Comparative Example 30 | N1 | N1 | 1.6 |

<8> Laminate-Typed Lithium Ion Secondary Battery

Example 120

The negative electrode (A1) and the standard positive electrode were punched into 50 mm×45 mm and 45 mm×40 mm, respectively. The punched out negative electrode and standard positive electrode and a separator (porous polypropylene film) interposed therebetween were inserted into an aluminum laminate bag, and were dried in an electric oven at 60° C. for 1 hour. In addition, a nonaqueous electrolyte solution was prepared in a glove box filled with argon gas. Specifically, first, a mixed solvent in which ethylene carbonate, ethyl methyl carbonate, and dimethyl carbonate were mixed at a ratio of 3:5:2 (volume ratio) was prepared. Next, relative to 100 parts by mass of the mixed solvent, 1 part by mass of VC (vinylene carbonate) and 1 part by mass of FEC (fluoroethylene carbonate, fluoroethylene carbonate) were added as additives, and then $LiPF_6$ was dissolved in a concentration of 1 M to obtain a nonaqueous electrolyte solution. Next, the nonaqueous electrolyte solution was injected into the aluminum laminate bag and the bag was sealed to manufacture a laminate-type lithium ion secondary battery (A1).

Examples 121 to 148 and Comparative Examples 31 to 36

Except that the negative electrode in Example 120 was changed those shown in Table 11, laminate-type lithium ion secondary batteries (A2) to (N1) were manufactured using the same method as Example 120.

TABLE 11

|  | Laminate-type lithium ion secondary battery | Negative electrode |
|---|---|---|
| Example 120 | A1 | A1 |
| Example 121 | A2 | A2 |
| Example 122 | A3 | A3 |
| Example 123 | A4 | A4 |
| Example 124 | A5 | A5 |
| Example 125 | A6 | A6 |
| Example 126 | A7 | A7 |
| Example 127 | A8 | A8 |
| Example 128 | A9 | A9 |
| Example 129 | AX | AX |
| Example 130 | AX | AX |
| Example 131 | B1 | B1 |
| Example 132 | C1 | C1 |
| Example 133 | CY1 | CY1 |
| Example 134 | CY2 | CY2 |
| Example 135 | CY3 | CY3 |
| Example 136 | D1 | D1 |
| Example 137 | E1 | E1 |
| Example 138 | F1 | F1 |
| Example 139 | G1 | G1 |
| Example 140 | H1 | H1 |
| Example 141 | I1 | I1 |
| Example 142 | A10 | A10 |
| Example 143 | C2 | C2 |
| Example 144 | H2 | H2 |
| Example 145 | H3 | H3 |
| Example 146 | H4 | H4 |
| Example 147 | H5 | H5 |
| Example 148 | H6 | H6 |
| Comparative Example 31 | J1 | J1 |
| Comparative Example 32 | K1 | K1 |
| Comparative Example 33 | M1 | M1 |
| Comparative Example 34 | I2 | I2 |
| Comparative Example 35 | M2 | M2 |
| Comparative Example 36 | N1 | N1 |

The evaluation results of the rate characteristics and the cycle characteristics of the laminate-type lithium ion secondary batteries made in Examples 120 to 148 and Comparative Examples 31 to 36 are shown in Table 12. The evaluation criteria are described below.

TABLE 12

|  | Laminate-type Li-ion secondary battery | Rate characteristics | Cycle characteristics |
|---|---|---|---|
| Example 120 | A1 | ++ | ++ |
| Example 121 | A2 | ++ | ++ |
| Example 122 | A3 | + | ++ |
| Example 123 | A4 | ++ | ++ |
| Example 124 | A5 | ++ | + |
| Example 125 | A6 | + | + |
| Example 126 | A7 | ++ | + |
| Example 127 | A8 | ++ | + |
| Example 128 | A9 | ++ | + |
| Example 129 | AX | ++ | +++ |
| Example 130 | AY | +++ | +++ |
| Example 131 | B1 | +++ | ++ |
| Example 132 | C1 | +++ | ++ |
| Example 133 | CY1 | +++ | +++ |
| Example 134 | CY2 | +++ | +++ |
| Example 135 | CY3 | +++ | ++ |
| Example 136 | D1 | +++ | +++ |
| Example 137 | E1 | +++ | +++ |
| Example 138 | F1 | + | + |
| Example 139 | G1 | ++ | + |
| Example 140 | H1 | ++ | +++ |
| Example 141 | I1 | + | + |
| Example 142 | A10 | + | + |
| Example 143 | C2 | ++ | ++ |
| Example 144 | H2 | + | + |
| Example 145 | H3 | + | ++ |
| Example 146 | H4 | + | ++ |
| Example 147 | H5 | ++ | ++ |
| Example 148 | H6 | ++ | ++ |
| Comparative Example 31 | J1 | − | − |

TABLE 12-continued

| | Laminate-type Li-ion secondary battery | Rate characteristics | Cycle characteristics |
|---|---|---|---|
| Comparative Example 32 | K1 | – | – |
| Comparative Example 33 | M1 | – | – |
| Comparative Example 34 | I2 | – | – |
| Comparative Example 35 | M2 | – | – |
| Comparative Example 36 | N1 | – | – |

(Rate characteristic)
+++ (excellent): rate characteristic being 80% or more.
++ (good): rate characteristic being 70% or more and less than 80%.
+ (acceptable): rate characteristic being 60% or more and less than 70%.
– (unacceptable): rate characteristic being less than 60%.
(Cycle characteristic)
+++ (excellent): cycle characteristic being 90% or more.
++ (good): cycle characteristic being 85% or more and less than 90%.
+ (acceptable): cycle characteristic being 80% or more and less than 85%.
– (unacceptable): cycle characteristic being less than 80%.

In the carbon nanotube dispersion liquids used in the above Examples, the average outer diameter of the carbon nanotubes ranged from more than 3 nm to 25 nm, the BET specific surface area ranges from 150 m²/g to 800 m²/g, and the average fiber length of the carbon nanotubes in the carbon nanotube dispersion liquid ranges from 0.8 μm to 3.5 μm. In the Examples, lithium ion secondary batteries excellent in rate characteristic and cycle characteristic were obtained as compared to the Comparative Examples. Therefore, it is clear that with this invention, lithium ion secondary batteries having high capacity, high output and high durability, which were difficult to implement with the conventional carbon nanotube dispersion liquid, can be provided.

The invention claimed is:

1. A carbon nanotube dispersion liquid for nonaqueous electrolyte secondary battery, being a carbon nanotube dispersion liquid containing carbon nanotubes, a dispersant and a solvent, and being characterized in satisfying (1) to (4) below:
   (1) an average outer diameter of the carbon nanotubes ranging from more than 3 nm to 25 nm;
   (2) a BET surface area of the carbon nanotubes ranging from 150 m²/g to 800 m²/g; and
   (3) a fiber length of the carbon nanotubes in the carbon nanotube dispersion liquid ranging from 0.8 μm to 3.5 μm,
   (4) a complex elastic modulus of the carbon nanotube dispersion liquid is 50 Pa or less, and a phase angle of the carbon nanotube dispersion liquid is from 10° to 50°.

2. The carbon nanotube dispersion liquid of claim 1, being characterized in that a product of the BET surface area (m²/g) of the carbon nanotubes and the fiber length (um) of the carbon nanotubes ranges from 200 to 2000.

3. The carbon nanotube dispersion liquid of claim 1, being characterized in that while in a Raman spectrum of the carbon nanotubes a maximum peak intensity within a range of 1560 cm⁻¹ to 1600 cm⁻¹ is G and a maximum peak intensity within a range of 1310 cm⁻¹ to 1350 cm⁻¹ is D, a G/D ratio ranges from 0.5 to 4.5.

4. The carbon nanotube dispersion liquid of claim 1, being characterized in that a volume resistivity of the carbon nanotubes ranges from $1.0 \times 10^{-2}$ Ω·cm to $3.0 \times 10^{-2}$ Ω·cm.

5. The carbon nanotube dispersion liquid of claim 1, being characterized in that, in a powder X-ray diffraction analysis of the carbon nanotubes, a peak is present at a diffraction angle of 2θ=25°±2°, and a half-value width of the peak ranges from 2° to less than 6°.

6. The carbon nanotube dispersion liquid of claim 1, being characterized in that a carbon purity of the carbon nanotubes is 95% or more.

7. The carbon nanotube dispersion liquid of claim 1, being characterized in that the dispersant is contained in an amount of from 20 parts by mass to 100 parts by mass relative to 100 parts by mass of the carbon nanotubes.

8. The carbon nanotube dispersion liquid of claim 1, being characterized in that a cumulative particle size D50 measured by a dynamic light scattering method ranges from 400 nm to 4000 nm.

9. The carbon nanotube dispersion liquid of claim 1, being characterized in that the carbon nanotubes are contained in an amount of from 0.5 part by mass to 3.0 parts by mass in 100 parts by mass of the carbon nanotube dispersion liquid, and a viscosity thereof measured at 25° C. using a B-type viscometer at a rotor rotation speed of 60 rpm ranges from 10 mPa·s to less than 2000 mPa·s.

10. The carbon nanotube dispersion liquid of claim 1, being characterized in that the solvent comprises water.

11. The carbon nanotube dispersion liquid of claim 1, being characterized in that a pH thereof ranges from 6 to 11.

12. A carbon nanotube resin composition, being characterized in comprising: the carbon nanotube dispersion liquid of claim 1, and a binder.

13. The carbon nanotube resin composition of claim 12, being characterized in that the binder comprises one or more selected from the group consisting of carboxymethyl cellulose, styrene butadiene rubber and polyacrylic acid.

14. A mixture slurry, being characterized in comprising: the carbon nanotube resin composition of claim 13, and an active material.

15. An electrode film, being a coating film of the mixture slurry of claim 14.

16. A nonaqueous electrolyte secondary battery, comprising a positive electrode, a negative electrode and an electrolyte, and being characterized in that at least one of the positive electrode and the negative electrode comprises the electrode film of claim 15.

* * * * *